United States Patent [19]

Raman et al.

[11] Patent Number: 4,730,197

[45] Date of Patent: Mar. 8, 1988

[54] IMPULSE INK JET SYSTEM

[75] Inventors: Gopalan Raman, Bethel; Robert A. Cordery, Danbury, both of Conn.

[73] Assignee: Pitney Bowes Inc., Stamford, Conn.

[21] Appl. No.: 55,979

[22] Filed: Jun. 1, 1987

Related U.S. Application Data

[63] Continuation-in-part of Ser. No. 795,584, Nov. 6, 1985, Pat. No. 4,680,595.

[51] Int. Cl.[4] .............................................. G01D 15/16

[52] U.S. Cl. .................................. 346/140 R; 346/1.1

[58] Field of Search ........................... 346/140, 1.1, 75

[56] References Cited

U.S. PATENT DOCUMENTS 3,946,398 3/1976 Kyser et al. .
4,282,535 8/1981 Kern et al. .
4,424,520 1/1984 Matsuda et al. .
4,459,601 7/1984 Howkins .
4,468,680 8/1984 Martner .
4,471,363 9/1984 Hanaoka .
4,502,058 2/1985 Koto .
4,509,059 4/1985 Howkins .
4,523,200 6/1985 Howkins .
4,523,201 6/1985 Liker .
4,525,728 6/1985 Koto .
4,605,939 8/1986 Hubbard ............................. 346/140
4,680,595 7/1987 Cruz-Uribe ......................... 346/140
4,695,854 9/1987 Cruz-Uribe ......................... 346/140

FOREIGN PATENT DOCUMENTS 152247 8/1985 European Pat. Off. .

OTHER PUBLICATIONS

Bupara, S. S. et al., "Characteristics of a High-Viscosity Oil-Base Ink-Jet Head", pp. 360-363, SID 84 Digest, 1984.

Stemme, E. and Larsson, S., "The Piezoelectric Capillary Injector-A New Hydrodynamic Method for Dot Pattern Generation", pp. 14-19, IEEE Transactions on Electron Devices, vol. Ed-20, No. 1, Jan. 1973.

*Primary Examiner*—Joseph W. Hartary
*Attorney, Agent, or Firm*—Peter Vrahotes; Melvin J. Scolnick; David E. Pitchenik

[57] ABSTRACT

An improved drop-on-demand ink jet print head is formed of a plurality of superposed metal plates that are diffusion bonded into a unit. A plurality of superposed metal plates are diffusion bonded into a unit. Punched and/or etched holes form ink passages that include manifolds that supply ink chambers through restrictors and exit orifices that supply ink to nozzles for ejection as droplets. Crosstalk among nozzles is minimized by the use of a compliant manifold plate and a relief slot in an adjacent nozzle plate so as to be coextensive with its associated manifold. The restrictors and the nozzles are substantially equal in diameter and length. The print head produces droplets up to 80 micrometers in diameter at frequencies up to 7 KHz with little variation in droplet size and velocity as a function of frequency.

31 Claims, 27 Drawing Figures

RESPONSE OF THE MENISCUS AT THE NOZZLE FOR A 7V SINE WAVE INPUT TO THE PIEZO CERAMIC DRIVER

VELOCITY VARIATION WITH VOLTAGE

FIXED WIDTH WAVEFORM

TEMPERATURE = 24°C
WIDTH = 100 μs; FREQUENCY = 250 Hz
VISCOSITY = 10cps; DENSITY = 1100 Kg/$m^3$

DIAMETER VARIATION WITH VOLTAGE

FIXED WIDTH WAVEFORM
TEMPERATURE = 24°C ; WIDTH = 100 (μs); VISCOSITY = 10cps
FREQUENCY = 250 Hz; DENSITY = 1100 Kg/m³

VELOCITY VARIATION WITH DROPLET EJECTION FREQUENCY

VARIABLE WIDTH WAVEFORM
VOLTAGE = 30 V.; WIDTH = 62 (μs)
TEMPERATURE = 26°C; VISCOSITY = 10cps
DENSITY = 1100 Kg/m³

MEAN
+5%
-5%

VARIABLE WIDTH WAVEFORM

VOLTAGE = 30 V; WIDTH = 62 (μs) ——·——·—— MEAN
TEMPERATURE = 26°C; VISCOSITY = 10cps – – – – – – – – +5%
DENSITY = 1100 Kg/m³ ——·——·—— −5%

VELOCITY VARIATION OF ADJACENT NOZZLE WITH DELAY TIME

FIXED WIDTH WAVEFORM
WIDTH = 100 (μs); FREQUENCY = 250 Hz
TEMPERATURE = 24°C; VISCOSITY = 10 cps
DENSITY = 1100 Kg/m³

VARIABLE WIDTH WAVE FORM

VELOCITY VARIATION WITH PULSE WIDTH

VARIABLE WIDTH WAVEFORM

VOLTAGE = 36 V; FREQUENCY = 250 Hz; VISCOSITY = 10 cps

DENSITY = 1100 $Kg/m^3$; TEMPERATURE = 26°C

IMPULSE INK JET SYSTEM

RELATED APPLICATIONS

This application is a continuation-in-part of application Ser. No. 795,584 filed Nov. 6, 1985 now U.S. Pat. No. 4,680,595.

BACKGROUND OF THE INVENTION

I. Field of the Invention

The present invention relates to a novel impulse, or drop-on-demand, ink jet print head and, more particularly, to optimal design and operating parameters for such a print head comprised of a plurality of plates held together in a superposed contiguous relationship.

II. Description of the Prior Art

Ink jet systems, and particularly impulse ink jet systems, are well known in the art. The principle behind an impulse ink jet as embodied in the present invention is the displacement of ink and the subsequent emission of ink droplets from an ink chamber through a nozzle by means of a driver mechanism which consists of a transducer (e.g., of piezoceramic material) bonded to a thin diaphragm. When a voltage is applied to the transducer, the transducer attempts to change its planar dimensions, but because it is securely and rigidly attached to the diaphragm, bending occurs. This bending displaces ink in the chamber, causing outward flow both through an inlet from the ink supply, or restrictor, and through an outlet or nozzle. The relative fluid impedances of the restrictor and nozzle are such that the outflow through the nozzle and restrictor are approximately equal. Fill of the ink chamber after a droplet emerges from the nozzle results from the capillary action of the ink meniscus within the nozzle which can be augmented by reverse bending of the transducer. Time for fill depends on the viscosity and surface tension of the ink as well as the impedance of the fluid channels. A subsequent ejection will then occur but only when fill has been accomplished and when, concurrently, the amplitude of the oscillations resulting from the first ejection have become negligible. Important measures of performance of an ink jet are the response of the meniscus to the applied voltage and the recovery time required between droplet ejections having uniform velocity and droplet diameter.

In general, it is desirable to employ a geometry that permits several nozzles to be positioned in a densely packed array. Since individual droplets normally have diameters of less than 100 micrometers, with 50 to 80 micrometers being typical diameters, it is normally desirable to produce an array of nozzles so that dots striking the surface can be connected together in a pattern. The diameter of an ejected droplet is typically of the order of the diameter of the nozzle that produces it. In order to write a connected line on a surface, it is common to use means such as a row of adjacent nozzles. It may also be desirable to arrange parallel rows of nozzles, with adjacent nozzles staggered so that one row fills the spaces left by a preceding row. In such an array, however, it is particularly important that the individual nozzles eject ink droplets of uniform diameter and velocity even at varying droplet ejection rates.

Past efforts to make drop-on-demand print heads have let to various approaches to solve the many problems that arise. It is necessary to decide upon the droplet diameter and velocity so as to achieve a desired resolution in printing. In general, it is easier to produce smaller droplet diameters at high ejection rates than larger diameter droplets. During the ejection process, the ink meniscus expands away from the nozzle until fluid instability causes the projecting fluid to cut off to a ligament that coalesces to a droplet and a remnant portion that draws back into the nozzle. Under conditions such as high velocity, the effect of this process is to form a main droplet and one or more satellite droplets which are typically smaller than the main droplet. The production of such satellite droplets may be an undesirable condition because the droplets may have speeds and directions that differ from the main droplet. Satellite droplets may also contribute to wetting at the nozzle. Wetting may lead to droplet misdirection or failure of emission.

In a properly operating drop-on-demand ink jet printer, a piezoelectric transducer is coupled mechanically to the chamber which bends the diaphragm. The fluid is substantially incompressible, and consequently air bubbles in the fluid within the chamber interfere with droplet ejection because air is compressible. As a result, it is necessary to eliminate or prevent air bubbles. The length of the nozzle and the operating voltage are chosen to prevent the ingestion of air.

The transducer must be designed so that the waveform is preferably one that is compatible with easily designed driver circuitry. The available voltage establishes the minimum dimensions of each transducer which, in turn, determines nozzle density. In general, in order to achieve the desired bending with the available voltage, a thin transducer is required.

The combination of a piezoelectric transducer bonded to a metal diaphragm was described by Stemme and Larsson in an article entitled "The Piezoelectric Capillary Injector—A New Hydrodynamic Method for Dot Pattern Generation," published in IEEE Transactions on Electron Devices, Volume ED-20, No. 1, January, 1973. One objective in the design of a driver is to facilitate a good mechanical coupling between the piezoelectric transducer and the diaphragm. This is typically done with a thin layer of an epoxy resin. It is also useful to minimize stress on the bond by matching flexibilities and thicknesses of the transducer and diaphragm so as to place a neutral zone of bending approximately at the plane of the bond.

Some representative examples of the prior art generally relating to ink jet print heads are noteworthy. U.S. Pat. No. 3,107,630 to Johnson et al is an early disclosure of the use of piezoceramic transducers being utilized to produce a high frequency cyclic pumping action. This was followed by U.S. Pat. No. 3,211,088 to Naiman which discloses the concept of an impulse ink jet print head. According to Naiman, when a voltage is applied to a transducer, ink is forced through the nozzle to form a spot upon a printing surface. The density of the spots so formed is determined by the number of nozzles employed in a matrix. Another variation of print head is disclosed in U.S. Pat. No. 3,767,120 issued to Stemme which utilizes a pair of chambers positioned in series between the transducer and the discharge nozzle.

Significant improvements over the then existing prior art are disclosed in a series of patents issued to Kyser et al, namely, U.S. Pat. Nos. 3,946,398, 4,189,734, 4,216,483, and 4,339,763. According to each of these disclosures, fluid droplets are projected from a plurality of nozzles at both a rate and in a volume controlled by electrical signals. In each instance, the nozzle requires that an associated transducer, and all of the components, lie in planes parallel to the plane of the droplets being ejected.

A more recent disclosure of an ink jet print head is provided in the U.S. Pat. No. 4,525,728 issued to Koto. In this instance, the print head includes a substrate having a plurality of pressurization chambers of rectangular configuration disposed thereon. Ink supply passages and nozzles are provided for each pressurization chamber. Each chamber also has a vibrating plate and a piezoceramic element which cooperate to change the volume of the pressurization chamber to cause ink to be ejected from the respective nozzles thereof.

In many instances of the prior art, ink jet print heads are assembled from a relatively large number of discrete components. The cost of such a construction is generally very high. For example, an array of ink jets requires an array of transducers. Typically, each transducer is separately mounted adjacent to the ink chamber of each jet by an adhesive bonding technique. This presents a problem when the number of transducers in the array is greater than, for example, a dozen, because complications generally arise due to increased handling complexities, for example, breakage or failure of electrical connections. In addition, the time and parts expense rise almost linearly with the number of separate transducers that must be bonded to the diaphragm. Furthermore, the chances of a failure or a wider spread in performance variables such as droplet volume and speed, generally increase. Additionally, in many instances, prior art print heads were large and cumbersome and could accommodate relatively few nozzles within the allotted space.

Typical commercial drop-on-demand ink jet print heads are available that produce droplets having diameters of the order of 80 micrometers at frequencies up to 3 KHz. Such print heads are typically designed to have an array of nozzles in one or more lines that spans a height of approximately 3.175 mm. In contrast, the printing of indicia or addresses on envelopes and the like presents some peculiar problems and opportunities. Their standard heights are approximately one inch and it is important to print them in one pass. Resolution is typically less important for this purpose than it is in general printing operations, and as a result, a droplet diameter of 70 to 80 micrometers is adequate. It is desirable to be able to print on objects moving at a velocity of 1.5 meters per second and to produce four dots per millimeter (100 dots per inch) from each nozzle. This requires a design frequency of at least 6,000 droplets per second from each nozzle, and an array of nozzles that is sufficiently numerous to span 25.4 mm (one inch).

One persistent problem that can interfere with successful and consistent operation of densely packed impulse or drop-on-demand ink jets is a phenomenon known as "crosstalk". This is the effect of the operation of one ink jet upon one or more other ink jets in an array, that is, from energy transfer from one ink jet to another ink jet. It may take place through a common ink source for two or more ink jet arrays that permits fluid coupling of a wave from one ink jet into another. Crosstalk may also result from the coupling of mechanical vibration through the solid structure of a print head. The effects of crosstalk through the solid structure are minimized by supplying sufficient rigidity to the structure. A number of systems have been employed to minimize crosstalk through the ink supply. In general, they involve the use of flexible tubing or other suitable structure to minimize the pressure wave that causes crosstalk.

The parent of the present application, namely, U.S. application Ser. No. 795,584 filed Nov. 6, 1985, is a distinct improvement over the prior art as just described and was conceived with knowledge of the prior art and the problems then existing. That application discloses an improved impulse ink jet print head and a method of fabricating such an improved print head. It comprises a plurality of superposed, contiguous plates including a nozzle plate with at least a pair of nozzles for ejecting ink droplets in a direction perpendicular to a plane of the plates. Another plate is a chamber defining at least a pair of coplanar axially aligned elongated chambers, each connected to a ink supply and having an outlet communicating with an associated nozzle. A diaphragm plate overlies the chamber plate and has transducers thereon for imparting a displacement of ink from each of the chambers to eject discrete ink droplets from the nozzles. Other plates may include a manifold plate for directing ink to a plurality of pairs of chambers and a restrictor plate with restrictors positioned between the ink supply and each of the chambers. The method of fabricating the print head includes forming the different plates, forming the transducers, and assembling all of the components in a particular relationship.

In short, it can be said that the invention disclosed in the parent to the instant application exhibits a significant advantage over earlier designs by providing a print head which is much more compact and which utilizes a reduced number of parts in its construction.

SUMMARY OF THE INVENTION

The present invention relates to an optimized drop-on-demand ink jet and the operating characteristics thereof which produces uniform droplets having diameters on the order of 70 to 80 micrometers at ejection rates up to and including 7 KHz. The ink jet is readily adapted for incorporation into a print head which has a plurality of relatively closely spaced and aligned nozzles, and its geometry is readily extended to produce whatever size of printed image is desired. These results are achieved at a relatively low manufacturing cost by the use of a structure that combines multiple functions in sheets and plates of stainless steel, or the like, that are punched or etched and joined into a single component by diffusion bonding.

Uniformity of thickness of individual transducer elements and mechanical coupling thereof is achieved by placing an entire sheet of piezoelectric transducer material so as to overlie the surface of a stainless steel diaphragm, then attaching it to the surface of the diaphragm by means of an epoxy resin adhesive. Individual transducer elements are then separated by sawing, laser cutting, or other suitable means, to provide a bilaminar plate to pulse the ink chambers. This insures uniformity of dimensions and placement of individual drivers which eliminates the need for performing electrical compensation such as voltage trimming. It is necessary that good mechanical design of the driver and optimal fluid path be coupled with an appropriate waveform to achieve a high ejection rate. The novel waveform utilized herein is employed which enables the use for the first time of low cost integrated circuit drivers. Mechanical uniformity among ink chambers is enhanced by the use of dummy chambers without active transducers at the ends of rows of chambers. The use of an input restrictor having a diameter substantially equal to its length and substantially identical to the output nozzle, and the use of a novel driving wave form, both contribute to the high ejection rate obtained. Fluidic crosstalk between nozzles is minimized by use of a compliant membrane that bounds the manifold supplying ink to various ink jets.

It is an object of the present invention to provide optimized physical parameters for an improved drop-on-demand ink jet which may be incorporated into a high density array.

It is another object of the present invention to provide optimal operating and fluidic parameters for an improved drop-on-demand ink jet.

It is a further object of the present invention to provide a drop-on-demand ink jet which produces relatively large droplets substantially identical in size and ejection velocity at ejection rates up to 7 KHz.

It is a further object of the present invention to minimize crosstalk among ink jets incorporated into a high density array with a large number of nozzles.

It is still another object to achieve uniform droplet velocities and diameters in an ink jet array without the necessity of performing electrical compensation.

It is still another object of the invention to utilize a single, low cost, commercially available IC chip containing the necessary drivers to operate an array of ink jets.

It is still a further object of the invention to provide an ink jet capable of ejecting ink droplets at a rate generally in excess of 5,000 droplets per second and up to 10,000 droplets per second by preventing the interference of oscillations remaining from the ejection of a preceding droplet.

Other and further features, objects, advantages, and benefits of the invention will become apparent from the following description taken in conjunction with the following drawings. It is to be understood that both the foregoing general description and the following detailed description are exemplary and explanatory but not restrictive of the invention. The accompanying drawings, which are incorporated in and constitute a part of this invention, illustrate some of the embodiments of the invention and, together with the description, serve to explain the principles of the invention in general terms.

DESCRIPTION OF THE PREFERRED EMBODIMENT

Primary goals sought to be achieved in the design of an ink jet print head are reproducibility, high droplet emission rate, ease of fabrication utilizing highly automated techniques, increased nozzle density, uniformity of performance among individual jets, and all of these with minimum cost. Such goals have been achieved by the invention disclosed in the parent application referred to previously and the instant disclosure presents optimal structural and operating parameters for that preferred design of ink jet print head.

Figure 1:
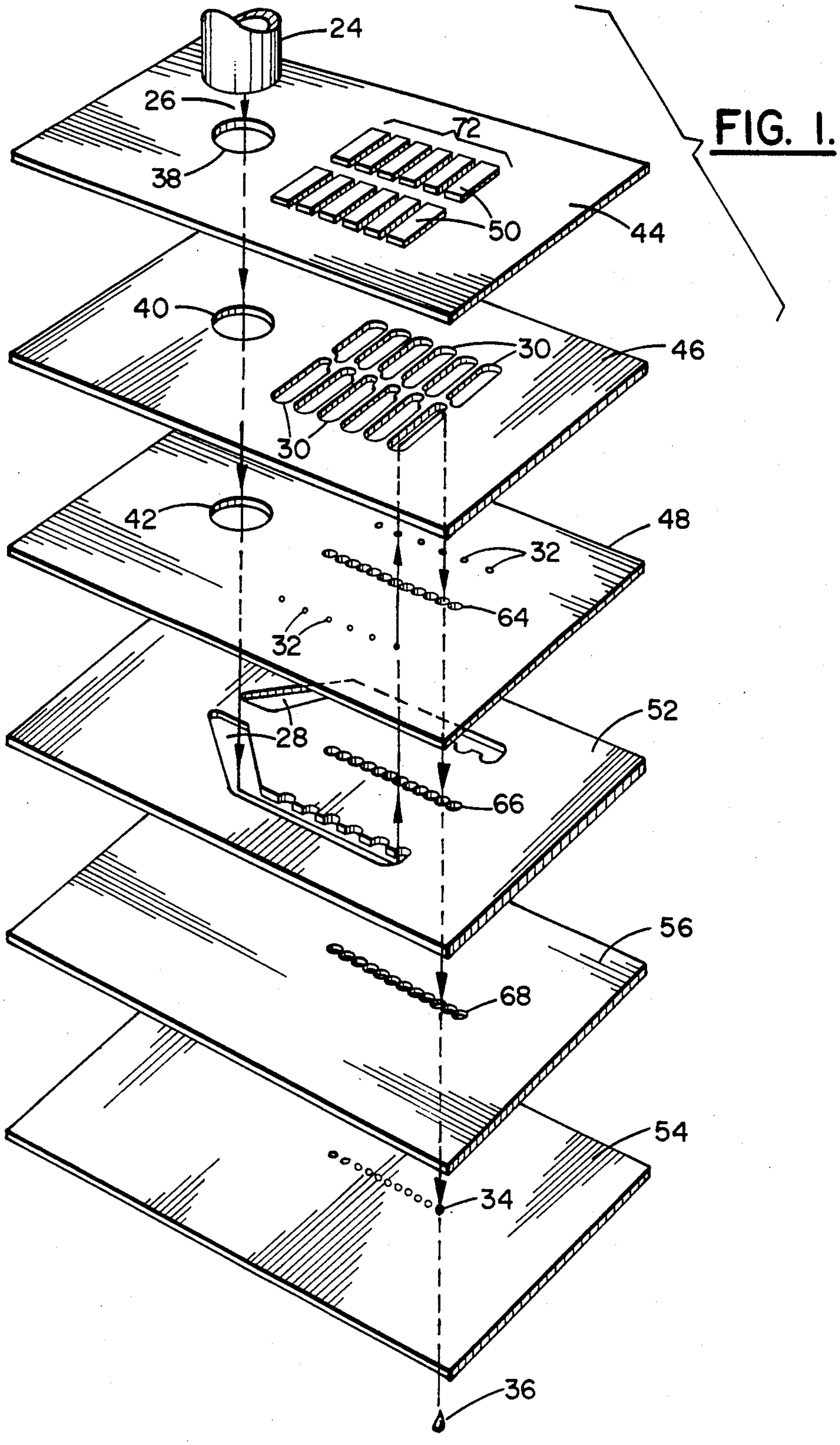
FIG. 1 is an exploded perspective view of a plurality of discrete plates employed in the construction of an ink jet print head embodying the present invention.
Figure 2:
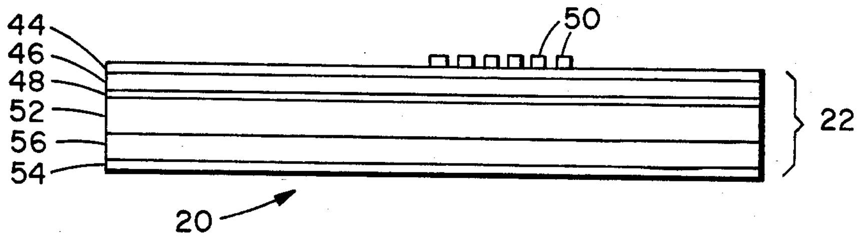
FIG. 2 is a side elevation view of the print head illustrated in FIG. 1.

Turn initially to FIG. 1 which illustrates, diagrammatically, basic components of an ink jet print head 20 generally embodying the invention. Although FIG. 1 illustrates a 12 nozzle print head, the concept of the invention can be reduced to a one or two nozzle configuration or can be extended to an n-nozzle array. That is, the concept of the invention can be employed for as many nozzles as desired, subject to material and size limitations. As illustrated in FIGS. 1 and 2, the print head 20 is comprised of a plurality of superposed, contiguous laminate or plates collectively represented by a reference numeral 22 (FIG. 2). Each of the plates 22 is individually fabricated and has a particular function as a component of the print head.

Figure 3:
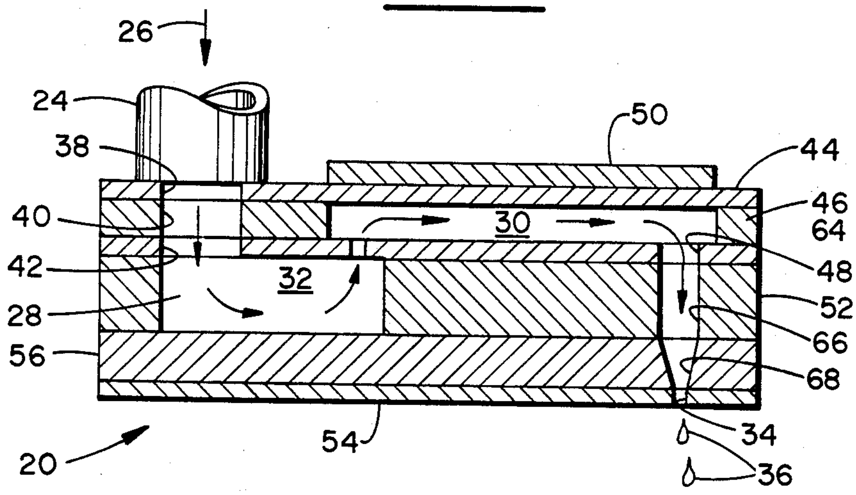
FIG. 3 is a diagrammatic cross section view illustrating the flow of ink through a print head constructed in accordance with the present invention.
Figure 5:
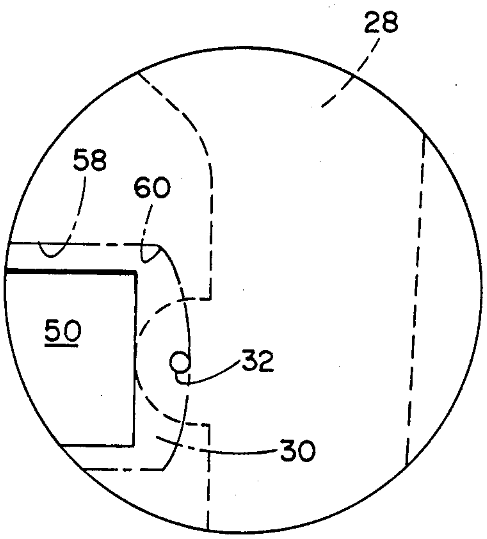
FIG. 5 is a detail top plan view illustrating, in enlarged form, a portion of FIG. 4 and specifically, the restrictor region.
Figure 6:
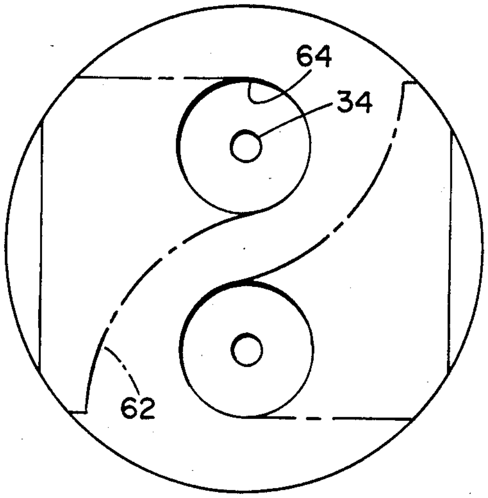
FIG. 6 is a detail top plan view illustrating, in enlarged form, another portion of FIG. 4 and, specifically, the nozzle region.

FIG. 3 is a diagrammatic view which illustrates the flow of ink through one nozzle of the print head 20, but is not intended to otherwise illustrate the relative dimensions or assembled print head of the present invention.

As particularly seen in FIGS. 1 and 3, ink enters through a feed tube 24 and continues through the print head 20 as indicated by a series of discontinuous arrowheads 26. The ink flows into a main chamber or manifold 28, then into a chamber 30 through a restrictor 32, then to a nozzle 34 through which discrete ink droplets 36 are ejected. As the ink flows from the feed tube 24 to the manifold 28, it passes through aligned holes 38, 40, and 42 formed, respectively, in a diaphragm plate 44, a chamber plate 46, and a restrictor plate 48.

Each of the two chambers formed in the chamber plate 46 extends completely therethrough and can be formed in a suitable manner as by etching. The roof of the chamber 30, which is the diaphragm plate 44, has a transducer 50 composed of a suitable piezoceramic material mounted thereon. Upon the application of a voltage to the transducer 50, the diaphragm 44 is caused to bend into the chamber 30 thereby resulting in the displacement of the ink within the chamber. This results in ejection of a droplet from the nozzle and subsequent oscillation of the meniscus and refill of the chamber.

Two important resonant modes are associated with these motions, usually at approximately 10 to 30 KHz and 2 to 5 KHz, respectively. Provided the kinetic energy of the ink in the nozzle sufficiently exceeds the surface energy of the droplet at the nozzle 34, a droplet 36 is ejected. Sufficient energy is imparted to the droplet so it achieves a velocity of at least 2 m/sec. and thereby travels to a printing surface (not shown) proximate to the print head 20. The dimensions of the transducer 50, the diaphragm 44, the nozzle 34, the chamber 30 and the restrictor 32 all influence the performance of the ink jet. Choice of these dimensions is coordinated with choice of an ink of a given viscosity. The waveform is also tailored to achieve the desired droplet velocity, diameter, fill time, and elimination of satellites.

In addition to those plates already named, the manifold 28 is formed in a manifold plate 52, the nozzle 34 is formed in a nozzle plate 54, and a taper plate 56 is positioned intermediate the manifold plate 52 and the nozzle plate 54. The plates 22 comprising the print head 20 may be fabricated from stainless steel or some other alloy, or of glass, or of other suitably stiff but workable material. As appropriate, they may be held together by using adhesives, brazing, diffusion bonding, electron beam welding or resistance welding.

Figure 4:
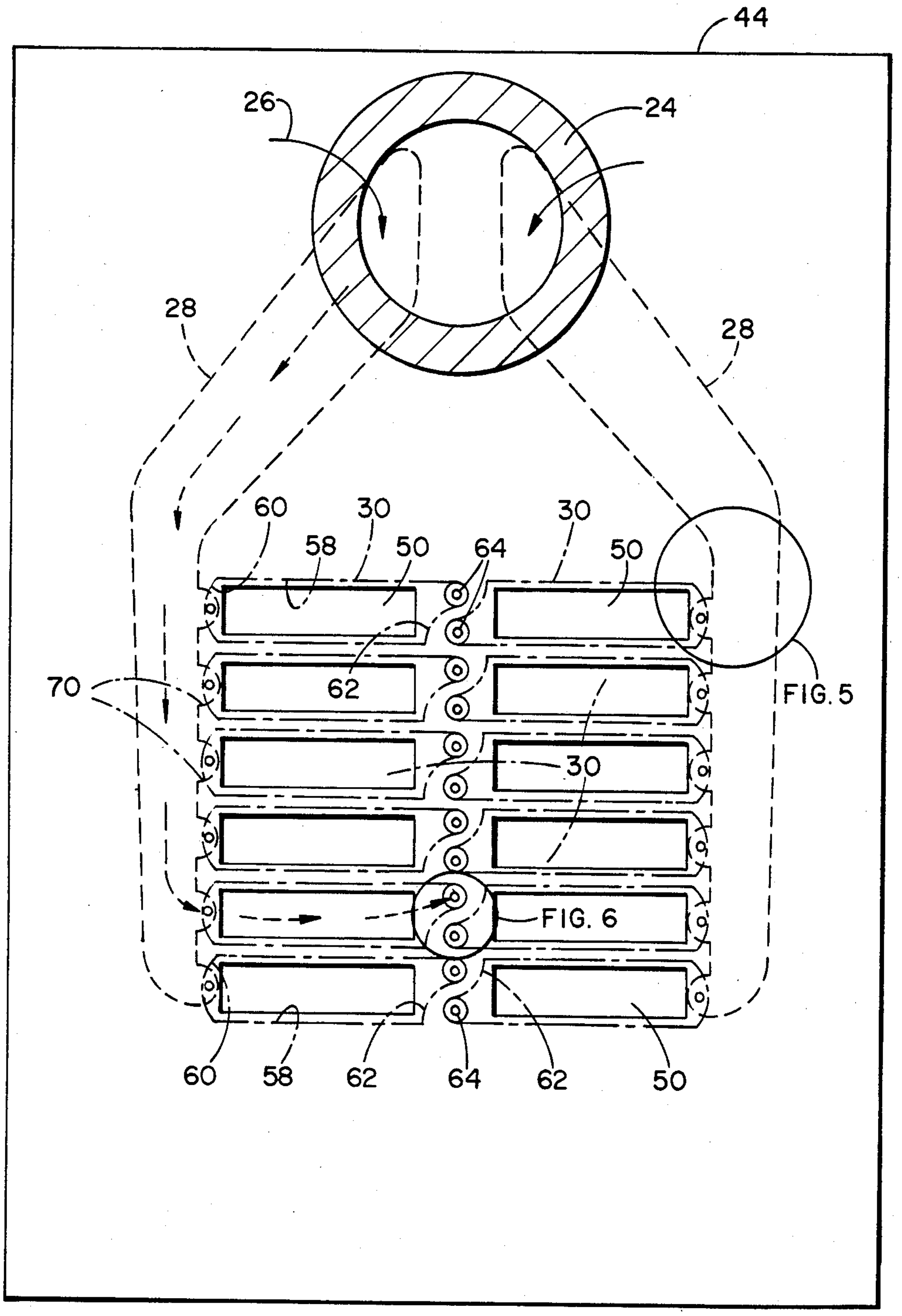
FIG. 4 is a top plan view of the print head illustrated in FIG. 1.

As best illustrated in FIG. 4, the individual chambers 30 are approximately rectangular, each having relatively long sidewalls 58 and relatively short endwalls 60 and 62. A pair of chambers 30 is axially aligned along their major axes and is proximately opposed to one another at their respective endwalls 62. As illustrated, each of the opposed endwalls 62 extends towards the other of the chambers 30 in an interlaced relationship and overlaps a plane transverse to the chamber plate 46 and containing axes of outlets 64 formed in the restrictor plate 48 and leading to the nozzles 34. Connector holes 66 and tapered holes 68 are formed in the manifold plate 52 and in the taper plate 56, respectively, to thereby connect each outlet 64 to an associated one of the nozzles 34. While the diameters of the outlets 64 and the connector holes 66 are approximately the same, each tapered hole 68 is tapered from its interface with the outlet 64 to its interface with the nozzle 34. Each set of outlets 64, connector holes 66, tapered holes 68, and nozzles 34 are preferably axially aligned, their axes being perpendicular, or at least transverse to, the plane of the manifold plate 52. The dimensions of the connector holes 66 and of the tapered holes 68 also influence the performance of the ink jet.

A plurality of pairs of the axially aligned chambers are formed in the chamber plate 46 in side by side relationship along their respective sidewalls 58. While six such pairs of chambers 30 are illustrated in FIG. 4 connected to 12 associated nozzles 34, it will be appreciated that the arrangement described can be utilized for as few as two nozzles or as many as reasonably desired. By reason of the interlaced relationship of the endwalls 62 and their associated outlets 64 and nozzles 34, a high density of the nozzles can be achieved while assuring the proper size of chamber 30 for the ejection of the droplets 36 from the nozzle 34. The depth of the chambers 30 is determined to the thickness of the chamber plate 46. In a typical construction, the distance between centers of the nozzles is between 0.5 and 0.76 mm.

The restrictor plate 48 separates the chambers 30 from the ink supply manifolds 28. Whereas the diaphragm plate 44 serves as the roof for the chambers 30, the restrictor plate 48 serves as the undersurface of the chambers. The restrictors 32 formed in a restrictor plate 48 are typically equal to or slightly smaller in diameter than the nozzles 34. This assures approximately equal flow of the ink through the nozzle 34 and through the restrictor 32. It will be appreciated that in order for the individual nozzles 34 in an array such as that provided by the print head 20 to exhibit a minimum and acceptable variation in performance, it is necessary that the restrictors 32 also be of uniform size. While the restrictors 32 can be formed in a number of ways, such as by drilling or electroforming using masks, it has been found that greatest accuracy and uniformity at the lowest cost currently known is achieved by means of punching.

As in the instance of the chambers 30 formed in the chamber plate 46, the manifolds 28 formed in the manifold plate 52 can be formed in a suitable manner as by etching and extend completely through the plate. As seen in FIGS. 1 and 4, a pair of manifolds 28 are formed in the plate 52 and extend from relatively broad ends at which they are in communication with the feed tube 24 to narrowed regions having a plurality of dimpled portions 70, each of which underlies an associated restrictor 32. As seen particularly in FIGS. 1 and 3, the restrictor plate serves as the roof for the manifolds 28 and the manifold plate 22. In a similar manner, the taper plate 56 serves as the undersurface for the manifolds 28 and to stiffen the structure of the print head.

There may also be instances in which it is desirable to completely eliminate the taper plate 56. In such an event, the orifice plate would serve as the undersurface for the manifolds 28 and the outlet connector holes 66 would be tapered in the manner of the tapered holes 68.

The nozzle plate 54, as best seen in FIG. 1, is formed with a row of nozzles 34 therein aligned with the outlets 64, connector holes 66, and tapered holes 68 when the print head 20 is fully assembled. The operation of the print head in ejecting the droplets 36 may be further improved by tapering the nozzles 34 as well as the tapered holes 68. Tapering assures a smoother transition between adjoining plates and thereby reduces ingestion of air.

Figure 7:
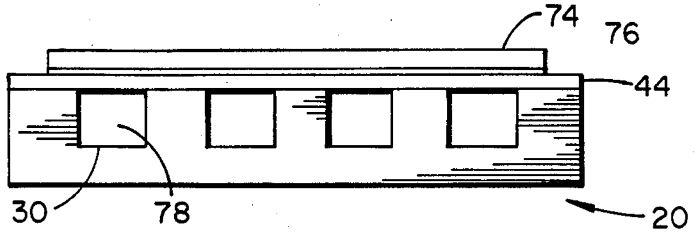
FIG. 7 is a cross sectional diagram illustrating a single sheet of a transducer material bonded to an ink jet array.

Referring now to FIGS. 1 and 7, a transducer array 72 comprising a plurality of the individual transducers 50 utilized in the impulse ink jet print head may be produced in accordance with the present invention by starting with a single sheet of transducer material, preferably and hereinafter referred to, as a piezoceramic material 74. In one embodiment the single sheet of piezoceramic material 74 is bonded by an adhesive layer 76, preferably composed of an epoxy or low temperature solder, to the diaphragm plate 44 in direct contact over the area of ink 78 in each of the compression chambers 30. The adhesive employed in the present invention to bond the piezoceramic material to the diaphragm should preferably be applied so as to be thin, gap filling, and, have a high shear modulus. When non-conducting adhesives are employed, there must be intimate contact between portions of the diaphragm and portions of the transducer material to assure electrical continuity.

In accordance with the present invention, a permanent polarization of the piezoceramic material 74 is preferably carried out prior to bonding this material to the diaphragm plate 44, i.e., poling of the piezoceramic material. The poling process can be achieved by applying a d.c. voltage to the piezoceramic material in excess of the saturation field of the piezoceramic material, i.e., 2.6 to $3.9\times10^6$ V/m.

Figure 8:
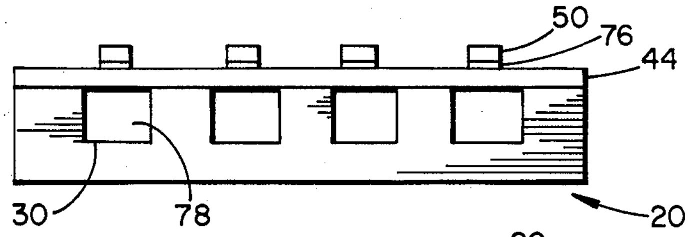
FIG. 8 is a cross sectional diagram illustrating a transducer array formed in accordance with the method of this invention including a plurality of discrete islands of the transducer material.

After the bonding operation, a sufficient amount of the piezoceramic material 74 is removed to form a plurality of discrete portions of the piezoceramic material extending from the diaphragm plate. In the impulse ink jet print head 20 these discrete portions, the resulting individual transducers 50 are positioned accurately over the chambers 30, that is, to within +/−0.0025 mm. In accordance with the present invention the amount and location of the piezoceramic material (including adhesive) that is removed can vary, and thereby result in different configurations for the transducer array 72. For example, and as shown in FIG. 8, a sufficient amount of piezoceramic material 74 is removed to form a plurality of discrete islands, i.e. individual transducers 50, of piezoceramic material bonded to the diaphragm plate 44 in areas directly over each associated chamber 30. Also, accurate placement and uniformity of dimensions are important to achieve minimum variation in performance from nozzle to nozzle.

Figure 9:
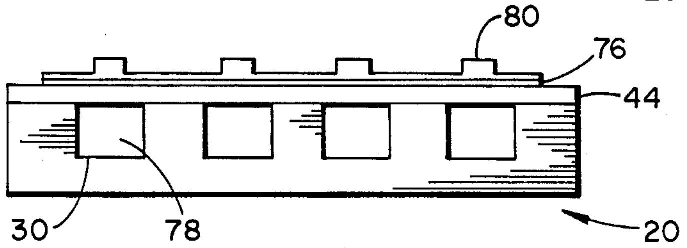
FIG. 9 is a cross sectional diagram illustrating a transducer array formed in accordance with the method of the present invention having a plurality of discrete portions of transducer material without total penetration of the transducer material.

During the process of removing piezoceramic material, care must be taken to avoid even slightly damaging the diaphragm which may be as thin as 0.050 mm. One way to minimize the chances of harming the diaphragm, is to avoid completely penetrating the piezoceramic material during the removal procedure. As shown in FIG. 9, this can be accomplished by removing only a sufficient amount of piezoceramic material to form a plurality of discrete portions 80 of piezoceramic material without totally penetrating the thickness of this material. Once again, these discrete portions 80 are formed in an area directly over the associated chambers. The stiffness of the remaining piezoceramic material over the ink chambers 30 where the processing of the ink occurs is not enough to affect the bending of the transducer and diaphragm materials, and therefore not enough to affect the displacement needed to drive the ink 78 out of its chamber 30 and through the nozzle 34 of the ink jet print head 20.

In many instances it may be preferred to mechanically strengthen the islands or discrete portions of piezoceramic material that is left after the process step of removing the transducer material for the purpose of decreasing the chances of having these transducer portions fail due to fracturing or fatigue. This is accomplished in accordance with the present invention and as shown in FIG. 10, by providing a smooth mechanical transition 82 at the boundary between a remaining portion 84 of the piezoceramic material and the diaphragm plate 44.

Figure 10:
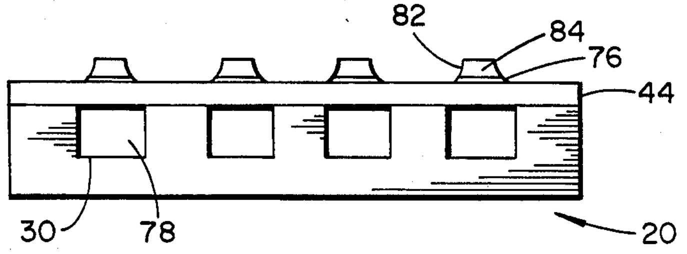
FIG. 10 is a cross sectional diagram illustrating a further embodiment of a transducer array formed by the method of the present invention.

The removal of transducer material to form any of the above described examples of discrete portions of transducer material as illustrated in FIGS. 8 through 10 can, in accordance with the present invention be accomplished by a variety of procedures. For example, one procedure that can be used involves chemical etching. Various types of acid solutions (e.g., solutions containing hydrofluoric acid, phosphoric acid, fluoroboric acid, sulphuric acid, nitric acid or hydrochloric acid) can be used to dissolve most of the piezoceramic matrix. Any residue can be rinsed or otherwise mechanically removed. To obtain a specific etch pattern, a mask may be formed by uniformly coating the piezoceramic with a polymer such as a photoresist and selectively dissolving sections of the polymer after ultraviolet light exposure through a photographically prepared mask. The remaining polymer is unaffected by the etchant used to dissolve the piezoceramic material. After removal of the unwanted piezoceramic, the remaining photoresist is dissolved. The specific depth of the chemical etch is determined by exposure time, temperature, concentration of the etchant and mechanical agitation. Using, for example, a piezoceramic material formed of a mixture of $PbO$, $ZrO_2$, $TiO_2$ and dopants, chemical etching to form discrete portions of piezoceramic material in accordance with the present invention has been accomplished with an acid solution of 10 ml. of HCl (specific gravity 1.19) and 3 ml. of HF (40% solution) at room temperature for periods of time up to about 3 hours.

Another process for removing piezoceramic material is laser scribing wherein continuous or pulsed lasers may be used to vaporize the unwanted sections of piezoceramic. The laser or the piezoceramic transducer is positioned mechanically under the control of the preprogrammed microprocessor. Many factors affect the ablation rate including laser output, atmosphere, focusing of laser, exposure time, gas assist, heat dissipation mechanisms, refractory nature of the specific piezoceramic, the effective emissivity of the piezoceramic, and the absorption of light. Care must be taken not to thermally stress the piezoceramic adjacent to the ablated region. Transducer arrays were made in accordance with this technique using a laser scribing procedure in which (a) Nd:YAG lasers were used; (b) both a continuous wave mode and a high frequency pulse (e.g., 5–10 KHz) modes were employed; (c) a scan speed of about 76 mm/sec. was used; (d) the procedure was tried with and without an aperture; and (e) both single and multiple passes were employed.

Another technique that can be used for removing piezoceramic material is use of an abrasive gas jet which is computer controlled. In this technique, a stream of fine particles (e.g., alumina) is shot through a tiny nozzle with high pressure gas to abrade away piezoceramic material in a controlled fashion. This technique is preferred because it is dry and introduces the least number of defects into the piezoceramic material. As with a laser, the cutting location is determined mechanically. Control parameters include exposure time, speed and density of particles, particle type, standoff distance, and the details of particle flow.

Still other techniques that can be used for removing the transducer material in accordance with the present invention include ultrasonic machining and saw cutting in which a diamond saw with a narrow kerf, such as used to dice silicon wafers, can cut out sections of the piezoceramic material. The saw cutting technique is generally limited to straight line cuts.

Ultrasonic machining employs a slurry of fine abrasive, such as for example, 600 grit boron carbide. The tool used can have any pattern, e.g. circles, rectangles, etc. The cutting tool vibrates over a small amplitude at high frequency, typically 20 KHz. The cutting motion can be precisely controlled and produces little force on the workpiece. Thus, very thin sheets of transducer material can be gently machined to close tolerance.

Thus, a greatly simplified construction of a drop-on-demand ink jet print head has been disclosed utilizing a plurality of plates or laminae resulting in ease of fabrication, while preserving uniformity of sizes for the restrictors and nozzles as well as increased nozzle density by reason of the interlacing arrangement of the nozzles and their associated chambers. Emphasis also has been placed on the advantages of the accuracy of formation, ease of manufacture, and reproducibility of the transducers utilized with the print head of the invention.

Figure 12:
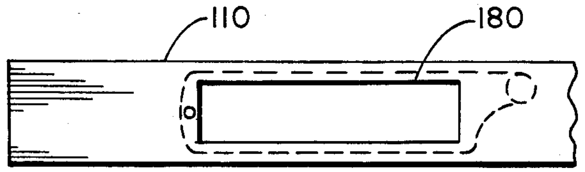
FIG. 12 is a top plan view of a portion of an assembled print head of the present invention.
Figure 13:
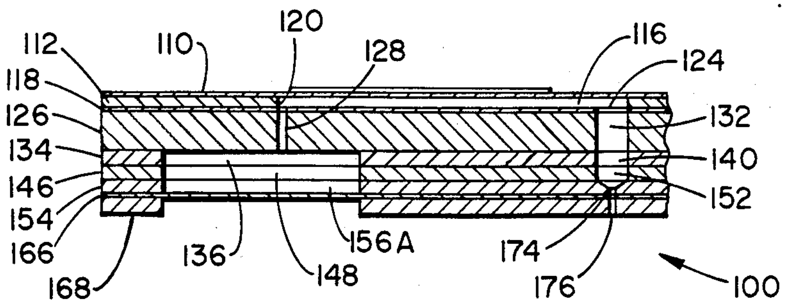
FIG. 13 is a sectional side elevation view of the assembled print head of the present invention taken along section lines 3—3 of FIG. 1.
Figure 11A:
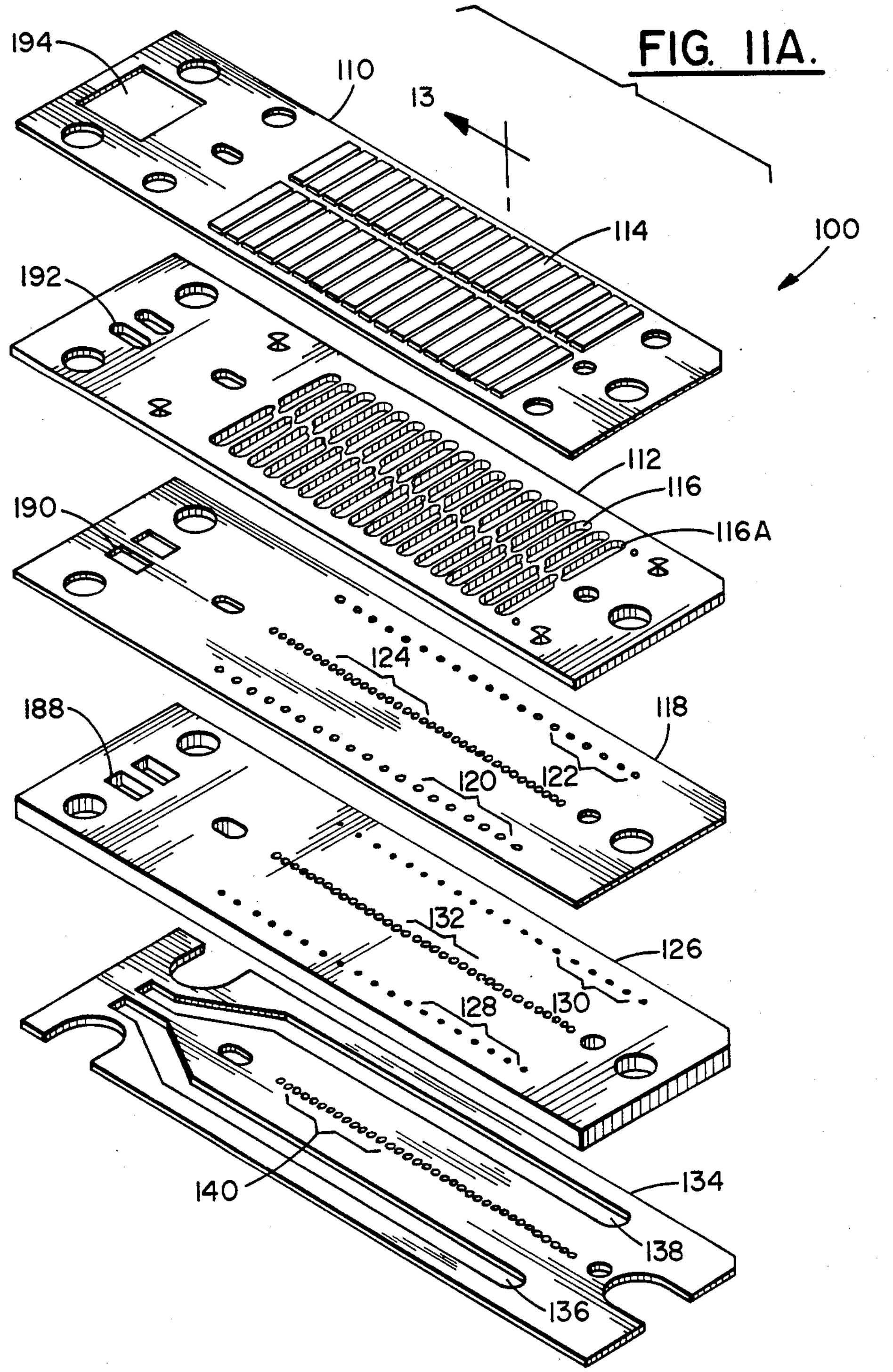
FIGS. 11A and 11B are an exploded perspective view of the primary components of an actual ink jet print head in accordance with the present invention.
Figure 11B:
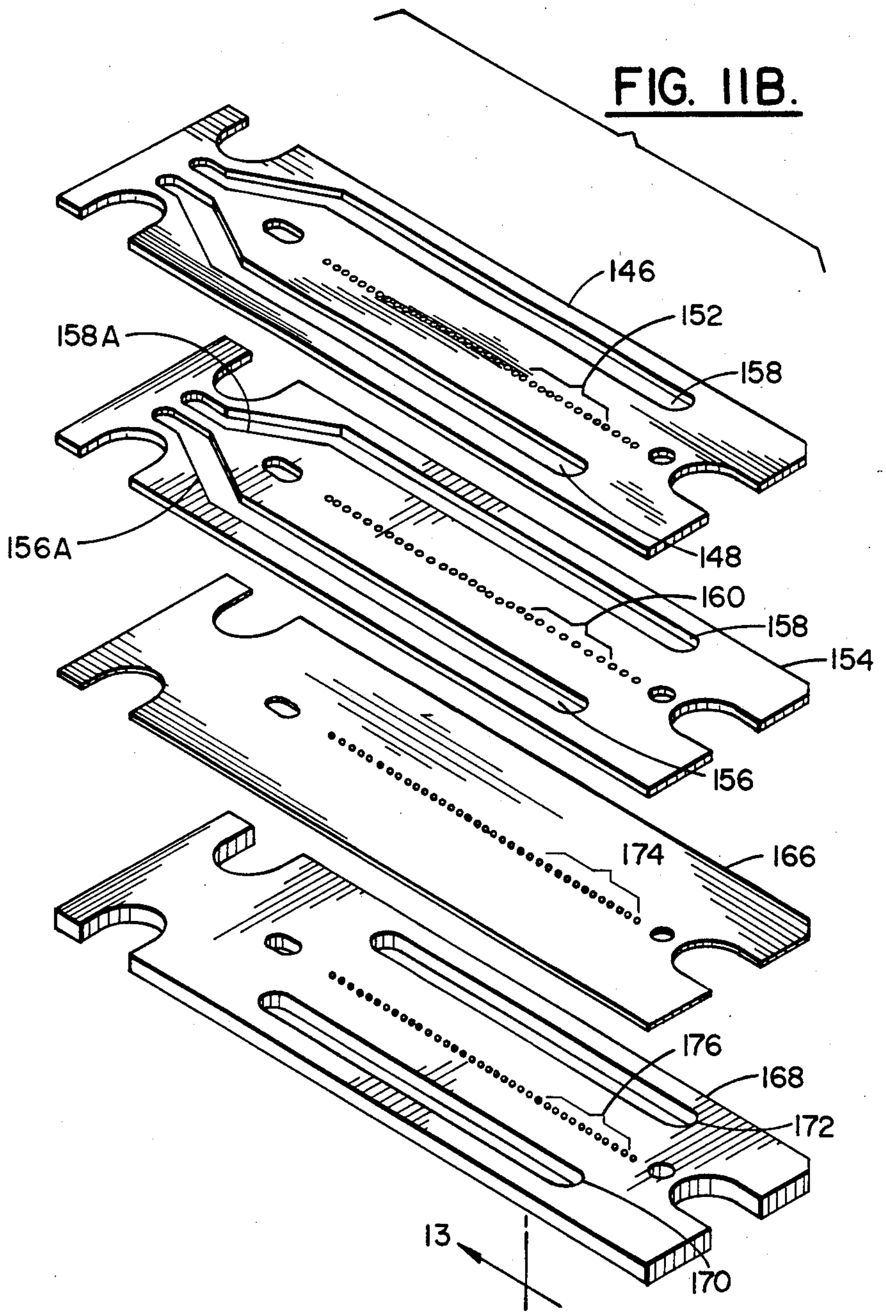

Turn now to FIGS. 11–13 which, in a reasonably accurate manner, portray a commercial version of an ink jet print head 100 embodying the invention. While the print head 100 of FIG. 11 is of more complex construction and includes more details than the print head 20 of FIG. 1, the manner of fabricating and assembling the components is identical except where specifically described as being otherwise. As seen in FIGS. 11 and 12, a diaphragm plate 110 overlies a chamber plate 112 and an array of piezoceramic transducers 114 is securely affixed to the chamber plate 112. Such a combination is referred to as a bilaminar plate or driver. A chamber plate 112, in turn, overlies a restrictor plate 118 to define the volume of each of a plurality of chambers 116, located under a corresponding plurality of transducers 114. The alignment of chambers 116 permits relatively close spacing of ink nozzles, while the volume of each chamber 116 can be varied by varying the thickness of the chamber plate 112.

The restrictor plate 118 includes arrays of restrictors 120 and 122 through which ink flows into the chambers 116. It also includes an array of exit orifices 124, adjacent ones of which are aligned with opposite chambers 116. The restrictor plate 118 overlies a stiffener plate 126, which has two rows of entry orifices 128 and 130 that are aligned with the restrictors 120 and 122, respectively, of the restrictor plate. The stiffener plate 126 also has a row of exit orifices 132 that are aligned with the exit orifices 124 of the restrictor plate 118 to form part of a passage for the flow of ink.

The stiffener plate 126 overlies a first manifold plate 134 which defines a pair of manifold cut-outs 136 and 138 that communicate with entry orifices 128 and 130, respectively, of the stiffener plate 126. Exit orifices 140 of the first manifold plate 134 similarly are aligned with exit orifices 132 of the stiffener plate 126 to continue an ink passage.

The first manifold plate 134, in turn, overlies a second manifold plate 146 which is typically identical to the first manifold plate 134. Thus, manifold cut-outs 148 and 150 of the second manifold plate 146 are aligned with manifold cut-outs 136 and 138 of the first manifold plate 134, respectively, and exit orifices 152 of the second manifold plate 146 are aligned with exit orifices 140 of the first manifold plate 134. The use of both a first manifold plate 134 and a second manifold plate 146 is one way of achieving a desired volume that is defined by manifolds 136, 138, 148 and 150 while using material that is thin enough to be easily processed. It is particularly convenient to manufacture the small holes, such as restrictors 120 and 122, entry orifices 128 and 130, and exit orifices 124, 132, 140 and 152 by a punching process, while etching the larger openings. Use of a plurality of plates allows a desired manifold size to be achieved without making the plates too thick to etch readily.

The second manifold plate 146 overlies a taper plate 154 which defines two manifold cut-outs 156 and 158 and an array of tapered orifices 160. The manifold cut-outs 156 and 158 are structurally and functionally similar to the manifold cut-outs 148 and 150 of the second manifold plate 146. Additionally, the tapered orifices 160 are aligned with the exit orifices 152, and are formed with a taper that is generally conical to begin a relatively smooth transition in dimension toward the dimensions of nozzles that will be used to eject ink droplets. It may be desirable to approximate a conical shape of tapered orifices 160 by punching the plate 146 with cylinders of decreasing radius and increasing depth. Alternatively, the tapered orifices 160 may be etched.

The taper plate 154 overlies a compliance plate 166 which, in turn, overlies an orifice plate 168 to complete the elements that form the basic structure of the print head 100. It will be appreciated that when the print head is fully assembled as illustrated in FIG. 13, the manifold cut-outs 136, 148, and 156 together with the bottom surface of the stiffener plate 126 and the top surface of the compliance plate 166 collectively also define a manifold 156A. In a similar fashion the manifold cut-outs 138, 150, and 158 together with the bottom surface of the stiffener plate 126 and the top surface of the compliance plate 166 collectively also define a manifold 158A. The compliance plate 166 includes a row of exit orifices 174 that are aligned with tapered orifices 160 of taper plate 154. The combination in sequence of exit orifices 124, 132, 140 and 152, tapered orifice 160, exit orifice 174 and nozzle 176 results in an exit channel for ink from each chamber 116.

With respect to the matter of compliance, it will be appreciated that when pressurized ink is introduced into the manifolds 156A, 158A, then drawn through the restrictors 120, 122 into the chambers 116 of the print head 100 by reason of the operation of the transducers 114 and diaphragm plate 110, pressure variations in one of the chambers 116 can be transmitted via a restrictor through the manifolds 156A, 158A to the neighboring restrictors and to the adjacent chambers resulting in the phenomenon of crosstalk. Crosstalk causes changes in velocity of ink droplets from the other nozzles. However, by reason of the present invention, with the manifolds 156A, 158A being fabricated so as to be compliant, such crosstalk is substantially reduced and even eliminated.

A manifold is said to be compliant when it dampens pressure changes occurring in the fluid. These pressure changes are caused by fluid entering the manifold from either the ink supply or through the restrictors 120, 122. The compliance of the manifold is defined as $dv_m/dp_m$ where $v_m$=volume of the manifold and $p_m$=pressure in the manifold and is a function of membrane thickness, cross sectional area, and modulus of elasticity. This compliance must be at least great enough so that only a minimal pressure is created in the manifold from either of the sources noted above. To this end, the compliance plate 166 is solid in the regions that abut manifold cutouts 156 and 158 of taper plate 154 and preferably has a thickness of 20 micrometers or less. The orifice plate 168 includes compliance relief slots 170 and 172 that are disposed below and have the same width as manifold cut-outs 156 and 158 in the region spanned by entry orifices 128 and 130 of stiffener plate 126. The compliance relief slots 170 and 172 permit that portion of the compliance plate 166 that forms the bottoms of the manifolds 156A and 158A to flex in response to a pressure change in the ink.

Manifold 136A is in communication with an aperture 188 in stiffener plate 126, which in turn is in communication with an aperture 190 of restrictor plate 118, then with an aperture 192 of chamber plate 112, and finally with an ink entry well 194 of the diaphragm plate 110. A similar array of apertures, not numbered here, connects the ink entry well 194 to the manifold 138A. An external ink supply, not shown here, can be connected to the ink entry well 194 to thereby supply ink to the manifolds 136A and 138A for each ink jet system beginning with the entry orifices 128, 130 and ending at the nozzles 176.

With continued reference to FIG. 11, ink is supplied to the assembled print head through the ink entry well 194, from which it flows to either manifold 136A or manifold 138A. Considering only manifold 136A as an example, ink flows through the entry orifice 128 and restrictor 120 to an active chamber 116, then in succession through exit orifices 124, 132, 140 and 152 to a tapered orifice 160, then through an exit orifice 174 to a nozzle 176. The term active chamber 116 is applied to distinguish those chambers that are driven by transducers 114 from dummy chambers 116A located at the ends of the array of chambers that have inactive transducers. The dummy chambers 116A, similarly sized and shaped to the active chambers 116, assure that each active chamber 116 is surrounded by identical geometry. This contributes to uniformity of droplet production among all of the nozzle systems. If the dummy ink chambers 116A at both ends of the print head have restrictors and nozzles, they will be filled with ink that is not ejected because the dummy chambers 116A have no associated active transducer 114. In the alternative, the dummy chambers may be without restrictors 128, 130 to keep them substantially dry.

There are several physical parameters of the ink jet print head 100 which are fundamental to obtaining optimal frequency response while requiring a minimum driving voltage. These parameters include:

(a) Ink fluid 78 with surface tension $\sigma$ and viscosity $\mu$.

(b) Nozzle 176 with diameter $D_n$ and length $L_n$.

(c) Restrictors 120, 122 with diameter $D_r$, and length $L_r$.

(d) Compression chamber 116 with length $L_c$, width $W_c$ and depth $d_c$.

(e) Driver comprising electromechanical transducer 114 bonded to diaphragm plate 110 over the compression chamber; combined characteristics: length $L_d$, $L_p$ width $W_d$, $W_p$, thickness $t_d$, $t_p$, and Young's modulus $E_d$, $E_p$, where d and p refer to diaphragm plate and piezoceramic driver, respectively.

Although there are many other system parameters, these are the most important ones. Additionally, there are several practical constraints on the design of the printhead, as follows:

(f) A droplet size of 70–80 micrometers is preferred; thus the nozzle diameter must be about 70–80 micrometers.

(g) For convenience of handling, the transducer 114 has a thickness greater than 50 micrometers and preferably between 100 and 125 micrometers.

(h) The surface tension of practical inks is usually between 40 and 50 dynes per cm.

(i) Droplet ejection should occur at frequencies up to at least 6,000 droplets per second without substantial variation in droplet diameter and speed.

(j) Droplet ejection should occur with a maximum electric field on the transducer small enough to avoid long term damage to the transducer. For the same reason, the electric field should be in the same direction as the initial polarizing field.

(k) The droplet ejection voltage should be less than about 60 volts so that it can be easily generated with available low cost IC drivers.

These practical constraints serve to determine the optimal values of the design parameters of the print head. The exact values of the parameters are determined by a combination of detailed modeling and experimental investigation. However, the functional relationship between the parameters can be understood physically.

As noted previously, following droplet ejection from a print head, a complicated oscillation of the fluid occurs. During and immediately after droplet ejection, the fluid in the ink jet is flowing according to the nonlinear Navier-Stokes equation. A short time following droplet ejection, however, the amplitude of the flow decreases to a point where the oscillation can be viewed as a coupled linear harmonic system. The parameters of this harmonic system are a set of mechanical compliances, fluid effective masses, and fluid resistances.

As defined earlier, compliance for fluid in a channel is $V/\rho c^2$ where V is volume, $\rho$ is density, and c is the speed of sound. The meniscus compliance $B_m$ is inversely proportional to the surface tension:

$$B_m=\pi r_n^4/(8\sigma)$$

where $r_n$ is the orifice radius. This is basically the inverse of a spring constant which appears in the modeling of the system. For a surface tension of 0.04 Newton/m, and a radius of 40 micrometers, the meniscus compliance is $2.5\times10^{-17}$m$^3$/(Newton/m$^2$).

The fluid effective mass $M_{eff}$ is defined in terms of the kinetic energy $E_K$ of the fluid in the channel, and the volume of fluid per second, Q:

$$E_K=0.5M_{eff}Q^2.$$

The effective mass of fluid in a channel is approximately:

$$M_{eff}=\rho L/A$$

where L and A are length and area of the channel, respectively. For a nozzle with a diameter and length of 80 micrometers and a fluid density of 1000 kg/m$^3$, the effective mass is $1.6\times10^7$ kg/m$^4$. The actual value of the effective mass depends on other factors such as entrance length and frequency. As high frequency response is required, the masses should be as small as possible. Fluid must converge to flow into a channel so the effective length of a narrowing in the fluid path is longer than the actual channel length by about the diameter. There is no real reduction of fluid effective mass if the channel length is reduced to much less than the diameter.

Damping is caused by viscous losses in the channels of the jet. The low frequency fluid conductance of a circular channel is described by Poiseuille flow:

$$dQ/dP=\pi r^4/(8L\mu)$$

where r is the channel radius and u is the fluid viscosity. For a viscosity of 0.01 Newton (s/m$^2$), the conductance of the nozzle above is $1.3\times10^{-12}$ (m$^3$/s)/(Newton/m$^2$). The actual damping factor is especially frequency dependent and must be calculated from the linearized Navier-Stokes equation.

The behavior of the ink jet is described by the two lowest frequency modes of oscillation of the harmonic system. The lowest frequency mode is referred to as the fill mode. This mode is basically driven by the restoring force of the meniscus and is responsible for drawing fluid from the reservoir to replace fluid ejected in a droplet. The next higher frequency mode, called the compression mode, is driven by the restoring force of the diaphragm. In this mode, as the diaphragm descends into the compression chamber, fluid is driven out the restrictor and the nozzle. Then, as the diaphragm rises, fluid is drawn into the compression chamber through the restrictor and the nozzle.

To obtain a proper frequency response, these two modes must be damped in the minimum possible time to prepare for the next droplet ejection. Because the same viscous forces are damping both modes, it is important that the compression mode is not too far above the fill mode. If the frequency difference is too large, then either the fill mode will be over damped causing a long wait for fill or the compression mode will oscillate causing variation in droplet velocity. Experimental evidence and modeling indicate that for a meniscus compliance of $2.5\times10^{-18}$m$^3$/Pa, the driver compliance should be n the range of $2\times10^{-18}$ to $10\times10^{-18}$m$^3$/Pa for optimal damping. If the driver is made much stiffer, then the voltage required increases and the compression mode frequency becomes too high, decreasing performance. If the driver is much softer, then the compression mode and fill mode frequencies decrease resulting in a low frequency ink jet.

Figure 23:
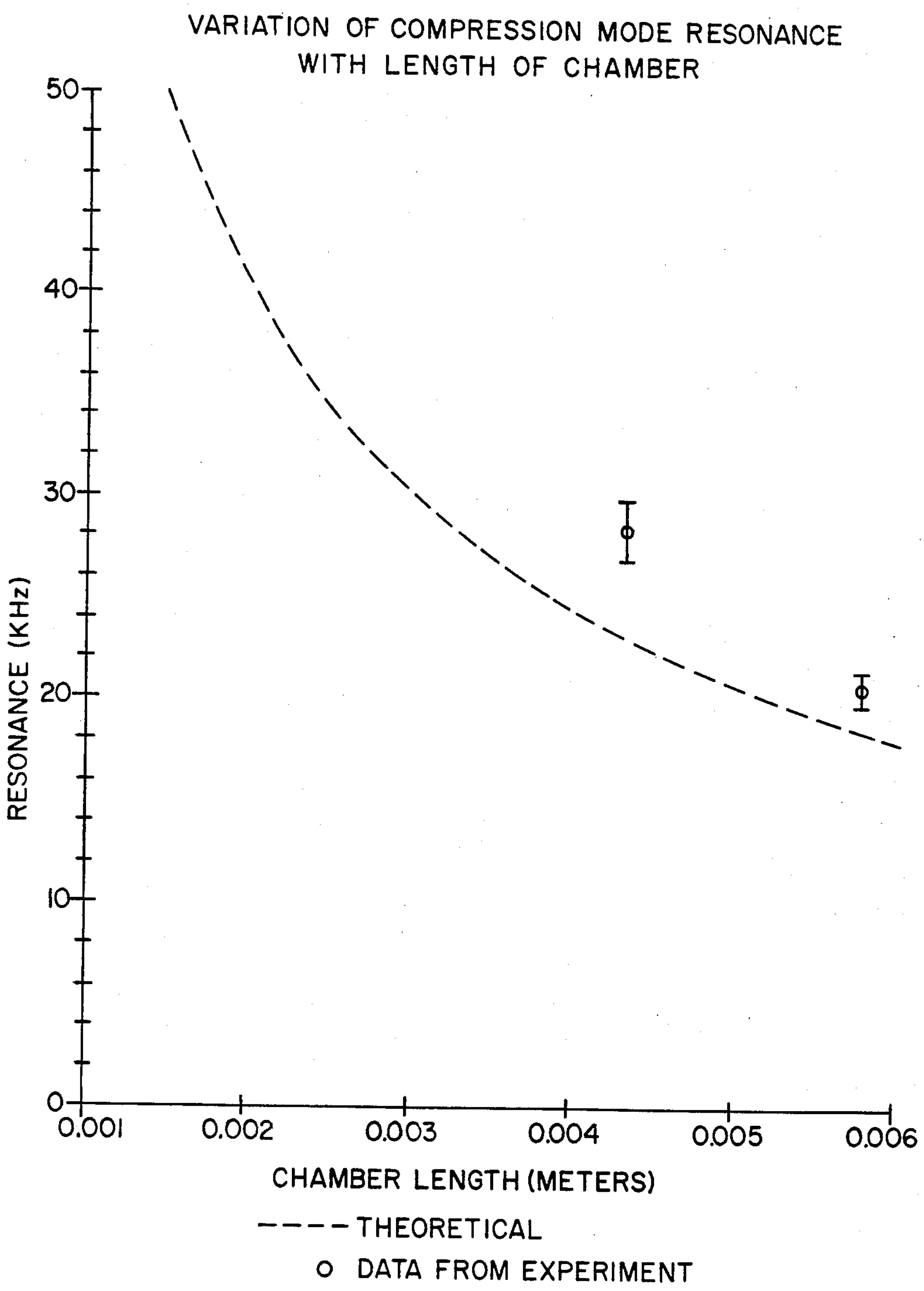
FIG. 23 is a plot of resonance frequency as a function of chamber length as experienced from operation of the print head of the present invention.

Changing the length of the compression chamber influences the stiffness of the driver, that is, combination of diaphragm plate 110 and transducer 114, and this, in turn, changes the compression mode. The effect of the length of the compression chamber on the compression mode was calculated using the model and a plot of the resonant frequency as the compression chamber length is varied from 1.52 to 7.62 mm for a fixed width of 1.27 mm is shown in FIG. 23. Also shown on the plot are the experimentally observed compression mode fluid resonances, and the agreement is excellent. As one increases the length of the compression chamber from 1.90 mm to 6.35 mm, the compliance of the driver increases by a factor of seven. Experimental observations suggest that the chamber length can be as long as 20 mm. However, this will result in reduction of the frequency of the compression mode and a correspondingly low maximum ejection frequency. Thus, the length of the compression chamber is in the range of 1.9–20 mm. Within the practical constraints determined by handling of the transducer, the compression chamber must have a width not much less than 1 mm, the range being 1.0–1.5 mm.

Practical limitations are such that the diaphragm thickness is greater than 50 micrometers. The plate stiffness of the diaphrapm is matched to the stiffness of the piezoelectric transducer in accordance with the equation:

$$(EI)_p=(EI)_d$$

where E=Young's modulus, p=piezoelectric transducer, I=moment of Inertia, and d=diaphragm.

Any suitable material can be chosen for the diaphragm plate 110 and thickness of the transducer 114 is chosen according to the above relationship. The diaphragm thickness is typically 75 micrometers for stainless steel, the range being 50–100 micrometers.

The neutral plane of the bender or driver formed by the transducer 114 and the diaphragm plate 110 should be near the bond plane between the two components. This requires that the plate stiffness of the diaphragm is about the same as for the transducer. These requirements determine the thickness of the transducer and the diaphragm, as a function of the compression chamber width and length. The width of the transducer is determined to optimize the voltage response of the ink jet. The preferred range is 80 to 100% of the width of the compression chamber. The length of the transducer is approximately equal to the length of the compression chamber.

If the fluid impedance of the restrictor is much larger than the fluid impedance of the nozzle, then the fluid will mostly flow out through the nozzle. As relatively little fluid is flowing in the restrictor, the damping of the compression mode will be poor. As the fill mode requires fluid to flow through the restrictor to fill the jet, the damping will be higher for this mode causing a long wait for filling.

If the fluid impedance of the restrictor is much lower than the fluid impedance of the nozzle, then in the compression mode the fluid will mostly flow out the restrictor. The energy required to eject a droplet will increase. The fluid flow in the compression mode will mostly be between the driver and the restrictor. This flow will not be well damped. The frequency response will be decreased. An even more serious problem would be fluid crosstalk with neighboring nozzle systems causing velocity variations.

It follows from the above discussion that the complex fluid impedance should be about the same from low frequency to above the compression mode frequency. To maximize the resonance frequencies, the imaginary component of the impedance, proportional to the effective mass, should be as small as possible. The nozzle and restrictor should be short with lengths approxiamtely equal to the diameter. The real component of the fluid impedance is the resistance. The resistance is inversely proportional to the fourth power of the diameter. Thus, the diameters must be very nearly equal. The exact value of the ratios of diameters and lengths is determined experimentally.

The commercial print head 100, as generally illustrated in FIGS. 11-13, has been built and tested. Table 1 is a listing of the components of the print head 100 reciting the preferred thicknesses of each of these components in an optimized design.

The commercial print head 100 as generally illustrated in FIGS. 11-13 has been built and tested. Table 1 is a listing of the components of the print head 100 reciting the preferred thicknesses of each of these components in an optimized design.

TABLE 1

THICKNESSES OF PLATES OF OPTIMIZED PRINT HEAD

| Component | Number | Thickness (Micrometers) |
|---|---|---|
| Diaphragm Plate | 110 | 80 |
| Chamber Plate | 112 | 200 |
| Restrictor Plate | 118 | 80 |
| Stiffener Plate | 126 | 300 |
| First Manifold Plate | 134 | 300 |
| Second Manifold Plate | 146 | 300 |
| Taper Plate | 154 | 120 |
| Orifice Plate | 168 | 80 |
| Compliance Plate | 170 | 20 |

All of the components of Table 1 were made of stainless steel that was diffusion bonded with nickel and phosphorus brazing material resulting in a unitary print head that is resistant to corrosive attack from ink. Preferred dimensions of the various orifices and nozzles of the optimized design print head 100 are recited in Tble 2. All of the orifices and nozzles are substantially cylindrical except for tapered orifices 60, which are substantially frusta of cones. The length of each compression chamber is approximately 3.175 mm and the width is approximately 1.27 mm. Successful results were also achieved with chamber lengths up to 20 mm.

TABLE 2

DIAMETERS OF ORIFICES OF OPTIMIZED PRINT HEAD (Dimensions expressed in micrometers)

| Orifice | Length | Diameter |
|---|---|---|
| Restrictors 128, 130 | 80 | 80 |
| Exit Orifices 124 | 300 | 500 |
| Entry Orifices 120, 122 | 300 | 500 |
| Exit Orifices 132 | 300 | 500 |
| Exit Orifices 140 | 300 | 500 |
| Exit Orifices 152 | 300 | 500 |
| Tapered Orifices 160 | 150-75 | 250-120 |
| Exit Orifices 174 | 300 | 500 |
| Nozzles 176 | 80 | 80 |

When the print head 100 is filled with ink, the ink will form a meniscus at each nozzle 176. As noted earlier, the ink between restrictors 120 and 122 and the associated nozzle 176 represents a fluid system whose flow can be described by the Navier-Stokes equation. While the basic Navier-Stokes equation is highly complex, a linear approximation of the equation allows calculations of performance of the print head. One solution applies during fill and another applies when a transducer is activated. The linear approximation does not apply when the meniscus is significantly extended.

Figure 14:
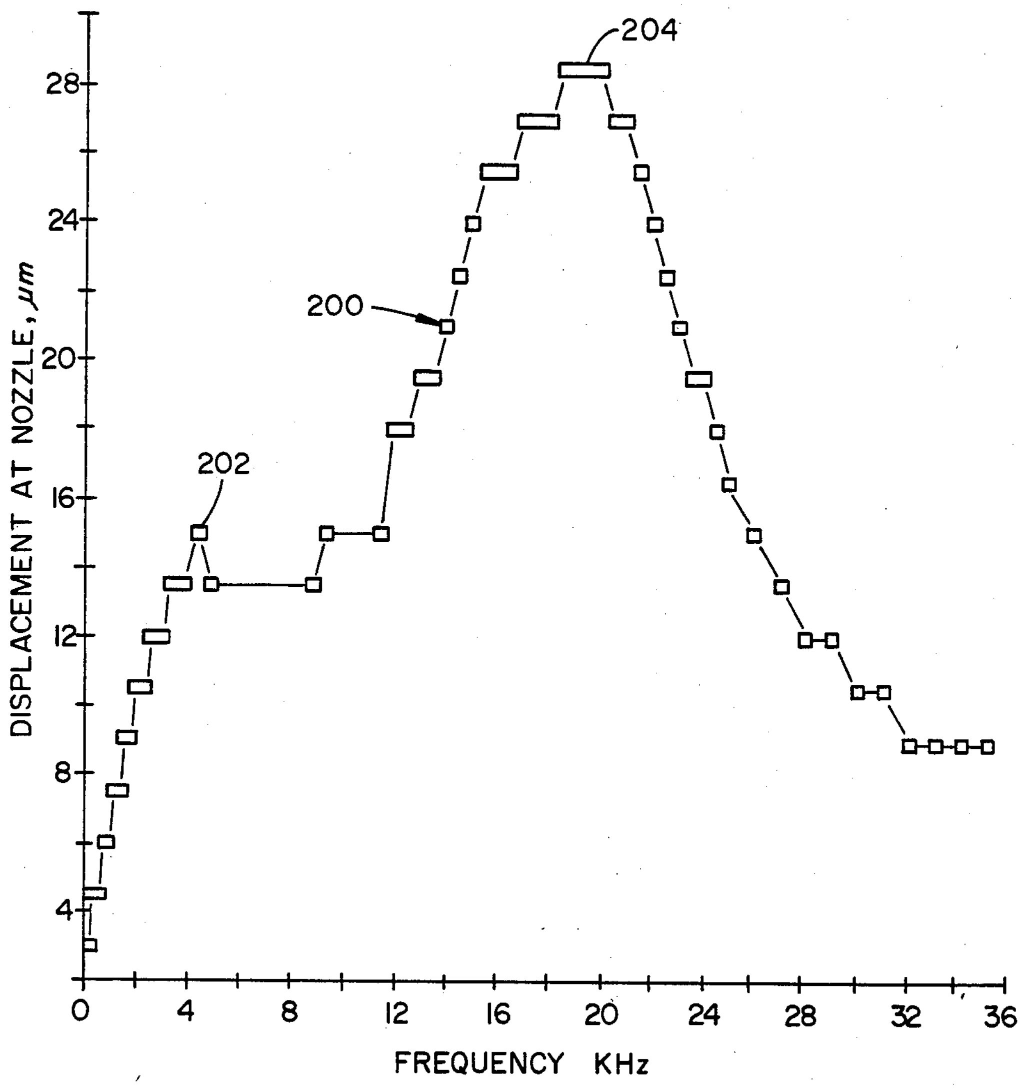
FIG. 14 is a plot of displacement of a meniscus at a nozzle of the present invention as a function of frequency and is referred to as the "linear response"
Figure 15:
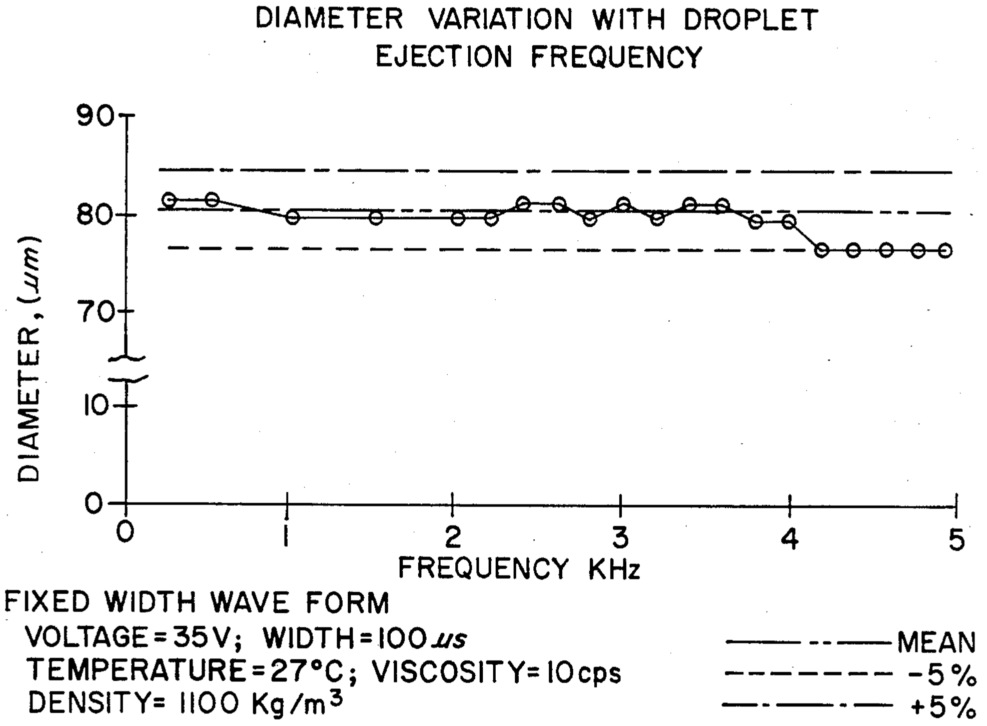
FIG. 15 is a plot of diameter variation of droplets as a function of ejection frequency as experienced from operation of the print head of the present invention utilizing a fixed width waveform.

An experimental measure of the effects of these equations can be determined by exciting an ink jet system with a sinusoidal voltage that is not large enough to eject droplets, and measuring the resulting displacement of the meniscus. The "linear response" shown in FIG. 14 is a plot of maximum displacement of the meniscus at the nozzle as a function of frequency. It is a tool which provides an indication of the operation of an ink jet during the time between successive droplet ejections.

Examinations of FIG. 14 shows a curve 100 with a peak or resonance 202 of moderate amplitude at a driving frequency of the order of 5 KHz, and a peak or resonance 204 of higher amplitude at about 20 KHz. A fluidic resonance is defined as a peak in the plot of the maximum displacement of the meniscus as a function of frequency. The low-frequency resonance 202 determines the length of time required to replenish the ink in the compression chamber. In addition, the stiffness of the bilaminar plate is a major factor in determining the compression mode resonance 204. That is, the stiffer the plate, the higher the frequency, and vice versa. These resonant frequencies of the fluid structure and the damping associated with each resonant frequency are significant in determining the maximum droplet frequency that can be achieved by a print head.

If the frequency of the fill mode is low, then droplet size decreases at higher frequencies and causes ink starvation, that is, insufficient ink enters the chamber 116 for subsequent ejection of a full size droplet. One goal of the designer of the print head 100 when attempting to optimize the system is to achieve as high a fill resonance frequency as possible without causing over damping while simultaneously achieving sufficient damping of the compression mode 204 to allow the highest possible frequency of droplet ejection. Overdamping occurs when the curve 200 in FIG. 14 is flattened at the location of the peak 202. Generally, the less damped the system is, the steeper, or sharper, are the peaks 202, 204, and the more damped the system is, the broader is the curve 200.

The influence of changing the nozzle and restrictor diameters is illustrated in Table 3 where the experimentally observed compression modes are given for various nozzle and restrictor diameter combinations. The compression mode remains high in these cases, suggesting high frequency operation of the ink jet. Although the fill mode also varies with changes in the nozzle and restrictor diameters, these are not listed in Table 3 since it is difficult to identify the peak due to lack of resolution in the resonance curve. However, it can be said that the fill modes are generally in the 4–5 KHz range.

TABLE 3

INFLUENCE OF NOZZLE AND RESTRICTOR DIMENSIONS ON RESONANCE

| Nozzle Diameter (micrometers) | Restrictor Diameter (micrometers) | Compression Mode (KHz) |
|---|---|---|
| 80 | 80 | 20.8 |
| 80 | 70 | 19.1 |
| 70 | 70 | 18.0 |
| 80 | 50 | 15.0 |

An investigation of a drop-on-demand nozzle structure as a resonant structure is presented in U.S. Pat. No. 4,525,728, issued to Koto and entitled, "Ink Jet Recording Head." Koto shows an idealized mathematical model which is depicted as essentially two parallel RLC circuits. This model is consistent with the dual resonance that is observable in FIG. 14 of the instant disclosure. The physical equivalent of the mathematical model can be described as follows.

In the steady state, ink fills the chamber and projects from the nozzle a sufficient amount to establish equilibrium with surface tension at the nozzle. For nozzles of diameters less than 100 micrometers, surface tension in inks is sufficiently great that gravitational forces are negligible by comparison. For this reason, such print heads can be used in any orientation, although directing droplets upwardly makes it difficult to keep the nozzles clean.

In the conventional operation of this print head, the transducer is energized with a positive square wave pulse having a fixed width. Thus, the driver is bent from a neutral position to an active position extending down into its associated chamber 116. After a fixed period of time, the transducer is de-energized and thereby returns to oscillate about the neutral position. The general upward movement of the driver serves to start the filling process. These oscillations will interfere with the next droplet ejection if they are not allowed to be damped. This limits the maximum ejection frequency.

In the practice of the present invention, the transducers are energized with a positive square wave pulse having a width such that the off time is preset. The return of the driver from the bent position creates oscillations above the neutral position as well as starting the filling process. In contrast to the conventional approach, the time for energizing the transducer occurs in phase with the oscillations, thus eliminating unwanted interference with the droplet ejection. This enables the ink jet to operate at the ejection frequency determined by the natural resonances.

The computer model was used to stimulate the "linear response" of the fluid system of the print head of FIGS. 11–13. The preferred design parameters listed in Table 3 were obtained by detailed experimentation as those representing an optimized ink jet capable of operating at a frequency up to 7 KHz. This frequency performance allows for variations in droplet speed and diameter no greater than +/−5% of their average values. The preferred values recited in Table 4 are consistent with producing droplets with diameters in the range of 70–80 micrometers. It will be understood that other preferred values within the ranges listed would be consistent with producing droplets of other sizes as small as approximately 50 micrometers.

TABLE 4

PREFERRED PARAMETERS

| Parameter | Range | Preferred |
|---|---|---|
| Nozzle diameter | 50 to 85 micrometers | 72 |
| Nozzle length | 1.0 to 2 times diam. | 80 |
| Restrictor diameter | 50 to 85 micrometers | 72 |
| Restrictor length | 1.0 to 2.0 times diam. (equal to nozzle) | 80 |
| Compression chamber: | | |
| Length | 2 mm to 20 mm | 6 mm |
| Width | 1.1 to 1.5 mm | 1.27 mm |
| Depth | 0.15 mm to 0.5 mm | 0.2 mm |
| Diaphragm thickness | 50 to 100 micrometers | 80 micrometers |
| Piezoceramic driver: | | |
| length | less than compression chamber length | 0.478 cm |
| width | 0.8 to 1.0 times width of compression chamber | 1.07 mm |
| thickness | matched to diaphragm $(EI)_d = (EI)_p$ | 0.13 mm |
| Fluid Viscosity: | 6 to 15 cp | 10 cp |
| Fluid surface tension | 40 dynes/cm or higher | |

where d refers to the diaphragm and p refers to the piezoceramic transducer.

A principal limit on the speed of operation is the lower frequency fill mode. The design objectives with respect to this mode are to achieve as high as possible a resonant frequency and to aim for critical damping of that resonant frequency. Viscosity of the ink is one parameter that contributes particularly to damping. Because of the interrelationship of parameters, critical damping for the fill mode leads to an underdamped or an oscillatory response for the higher frequency mode that is associated with the meniscus resonance. In the print head that has been built with these dimensions, oscillations of the meniscus have been damped to a low enough value that they do not interfere with droplet formation at frequencies as high as 7 KHz.

Figure 16:
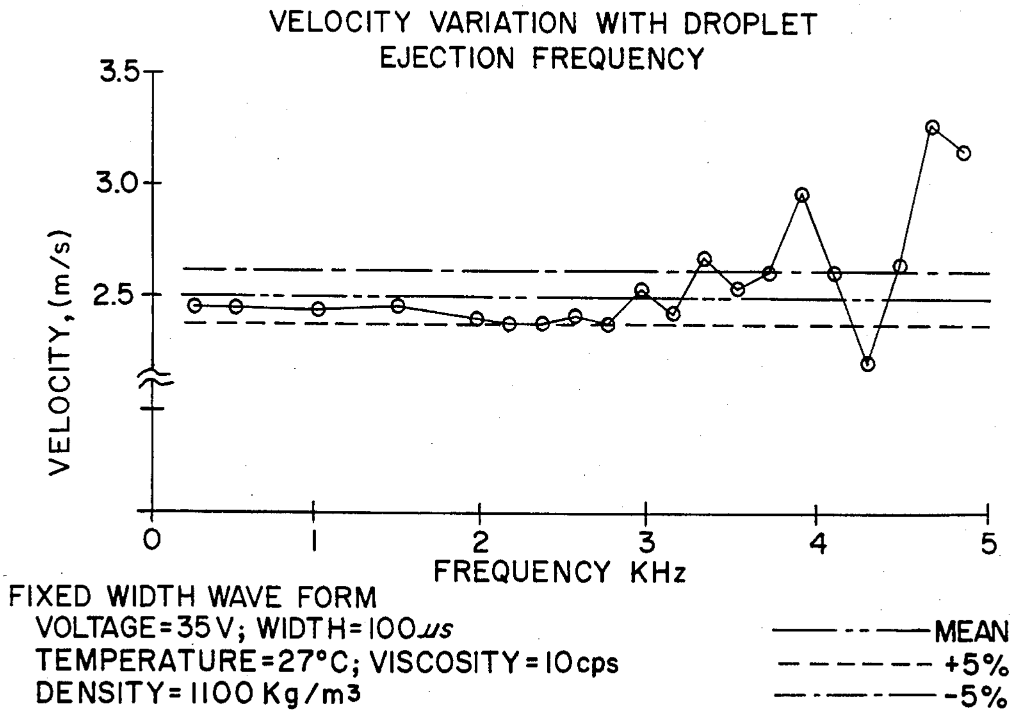
FIG. 16 is a plot of droplet velocity variation as a function of ejection frequency as experienced from operation of the print head of the present invention utilizing a fixed width waveform.
Figure 17:
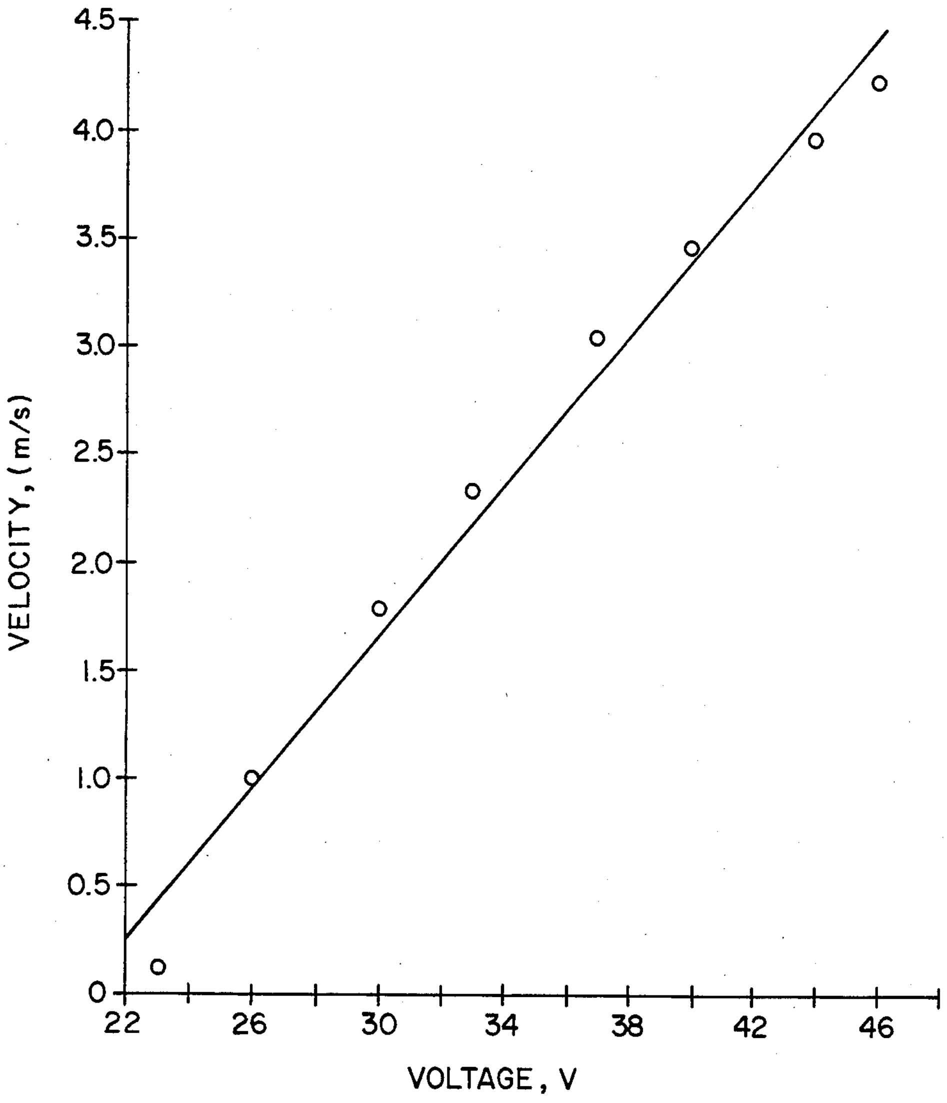
FIG. 17 is a plot of velocity variation of a droplet as a function of voltage as experienced from operation of the print head of the present invention.
Figure 18:
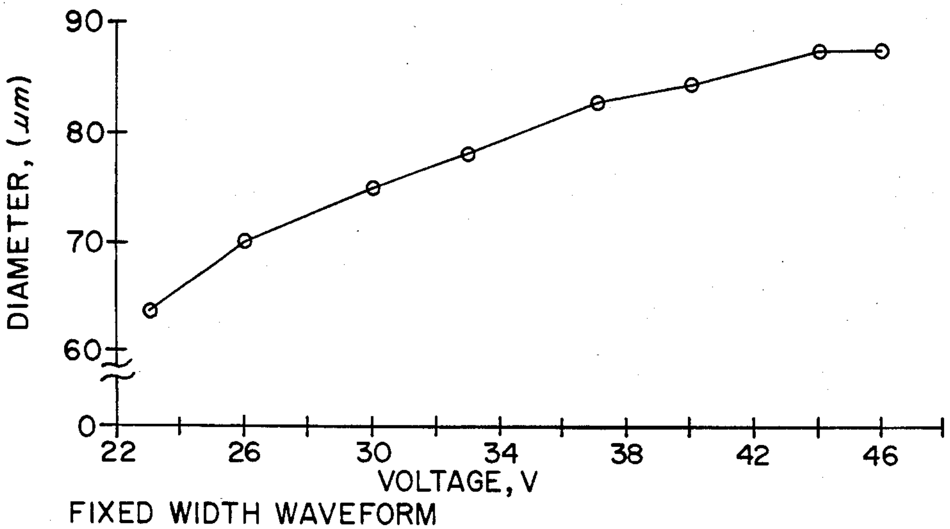
FIG. 18 is a plot of diameter variation of a droplet as a function of voltage as experienced from operation of the print head of the present invention.

FIGS. 15–20 are plots of test results of a typical print head constructed according to FIG. 11. The diameter of the droplets ejected by such a print head for a 35 V, 100 microsecond positive square pulse is given in FIG. 15. The droplet diameter is 80 micrometers and is uniform (that is, within +/−5%) up to 5 KHz droplet ejection frequency. The velocity of the droplets under the same conditions is depicted in FIG. 16. A 5% variation is indicated up to 4 KHz. One may choose to operate at a different voltage. FIG. 17 displays experimentally observed variation of velocity of droplets ejected from a typical nozzle as the operating voltage is varied. Velocities as high as 4.0 m/s without formation of satellites is achieved at an operating voltage of 45 volts. The variation of diameter of droplets for the same test conditions as in FIG. 17 is shown in FIG. 18. It follows from this figure that droplet diameter as large as 85 micrometers can be achieved by operating at a voltage of 45 volts. These results are in accordance with the print head requirements originally set forth as goals for this invention.

Figure 19:
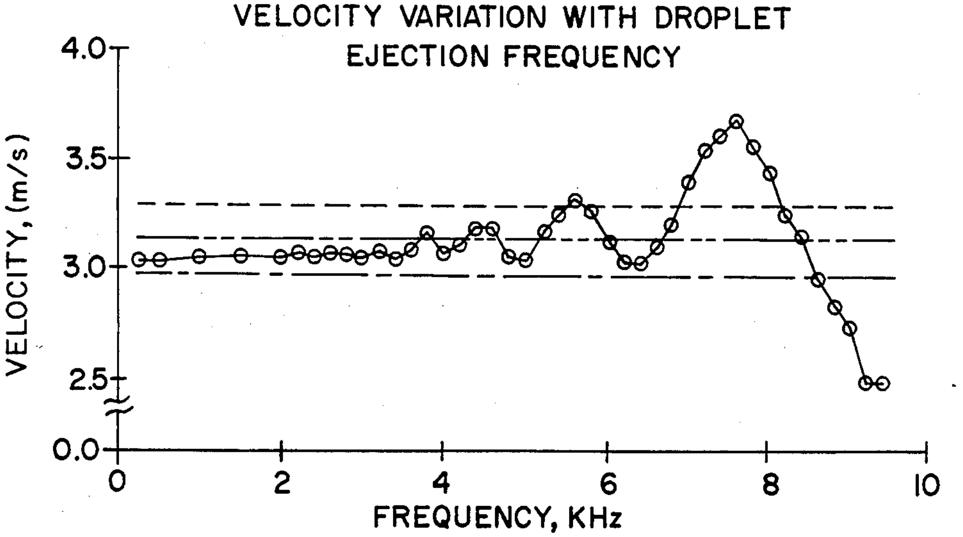
FIG. 19 is a plot of droplet velocity variation as a function of ejection frequency as experienced from operation of the print head of the present invention utilizing a variable width waveform.
Figure 20:
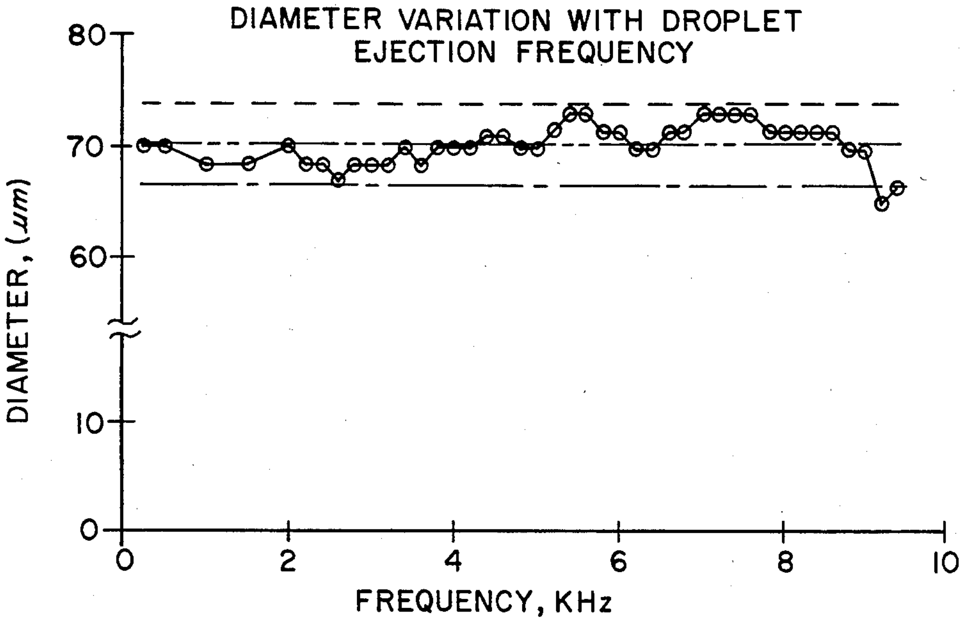
FIG. 20 is a plot of diameter variation of droplets as a function of ejection frequency as experienced from operation of the print head of the present invention utilizing a variable width waveform.

One is not limited to either operation with positive square pulses or 100 microsecond pulse width. Narrower pulses, especially below 20 microseconds, will require higher voltages of operation to achieve a desired velocity and diameter. Also there is a definite advantage in operating the print head with a variable width waveform to be discussed below. Referring to FIG. 19, one observes that the velocity of droplets remains uniform (that is, within +/−5%) up to 7 KHz when the print head is energized with a variable width pulse (62 microseconds, 30 V), and the droplet diameter remains uniform at 70 micrometers up to 10 KHz as displayed in FIG. 20.

Figure 21:
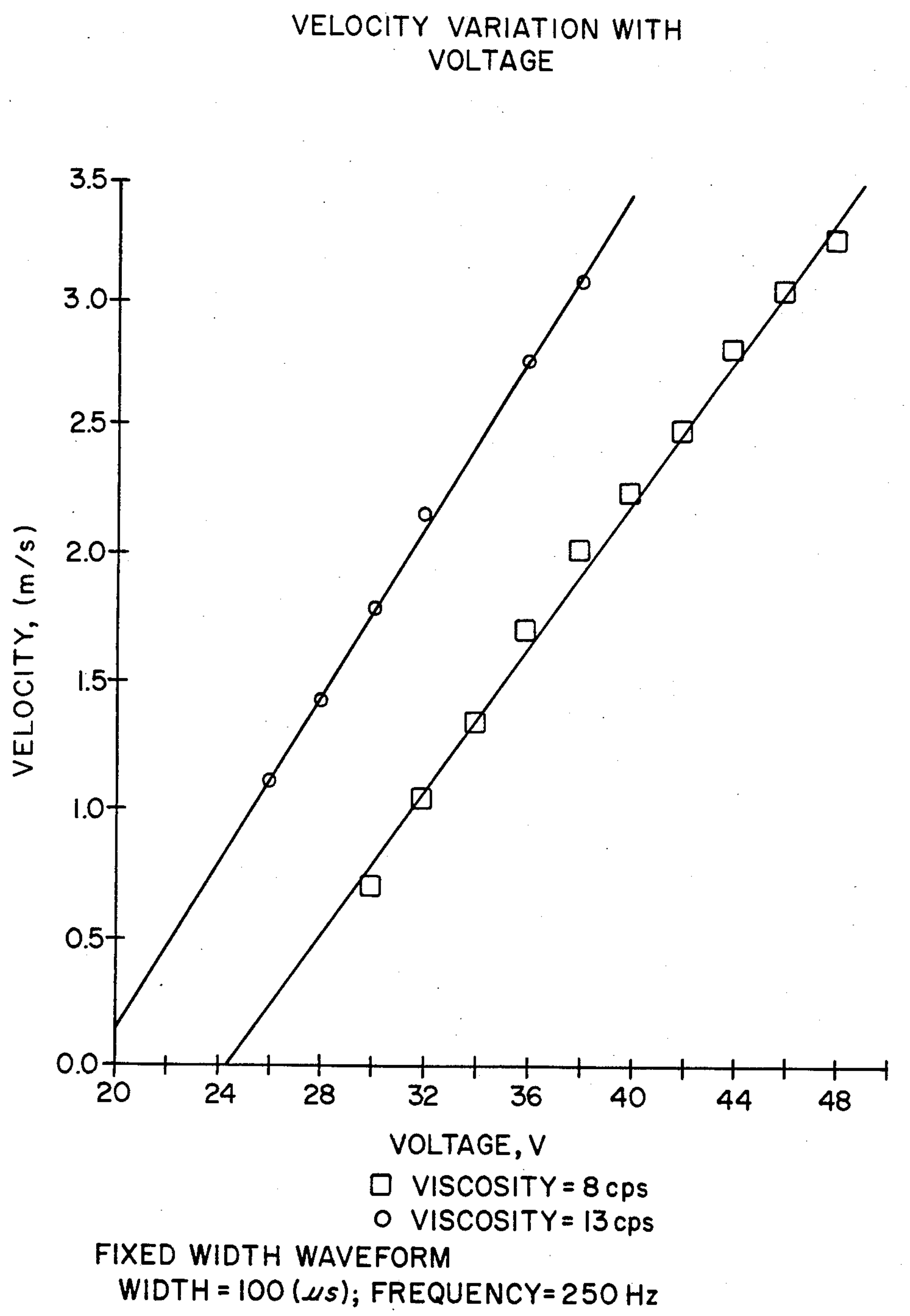
FIG. 21 is a plot of velocity variation of a droplet as a function of voltage for two different viscosities of ink as experienced from operation of the print head of the present invention.

The above results were obtained for inks having a viscosity of approximately 10 cp. One may use inks of higher viscosity and achieve a higher droplet ejection rate with uniform velocity. Increasing viscosity above 10 cp, however, has a detrimental effect on the response of the ink jet in that increased energy is required to eject a droplet at a fixed velocity. FIG. 21 displays the variation of droplet velocity with voltage for viscosities of 8 and 13 cp. For achieving a velocity of 2.5 m/s, one would require 31 V with an 8 cp ink compared with 40 V for a 13 cp ink, an increase of 30%. Also, an increase of viscosity increases the fill time resulting in starvation or decreased droplet diameter at higher frequencies of droplet ejection. It follows from the above discussion that the useful range of viscosity for inks is approximately between 6 and 15 cp, the preferred value being 10 cp.

Figure 22:
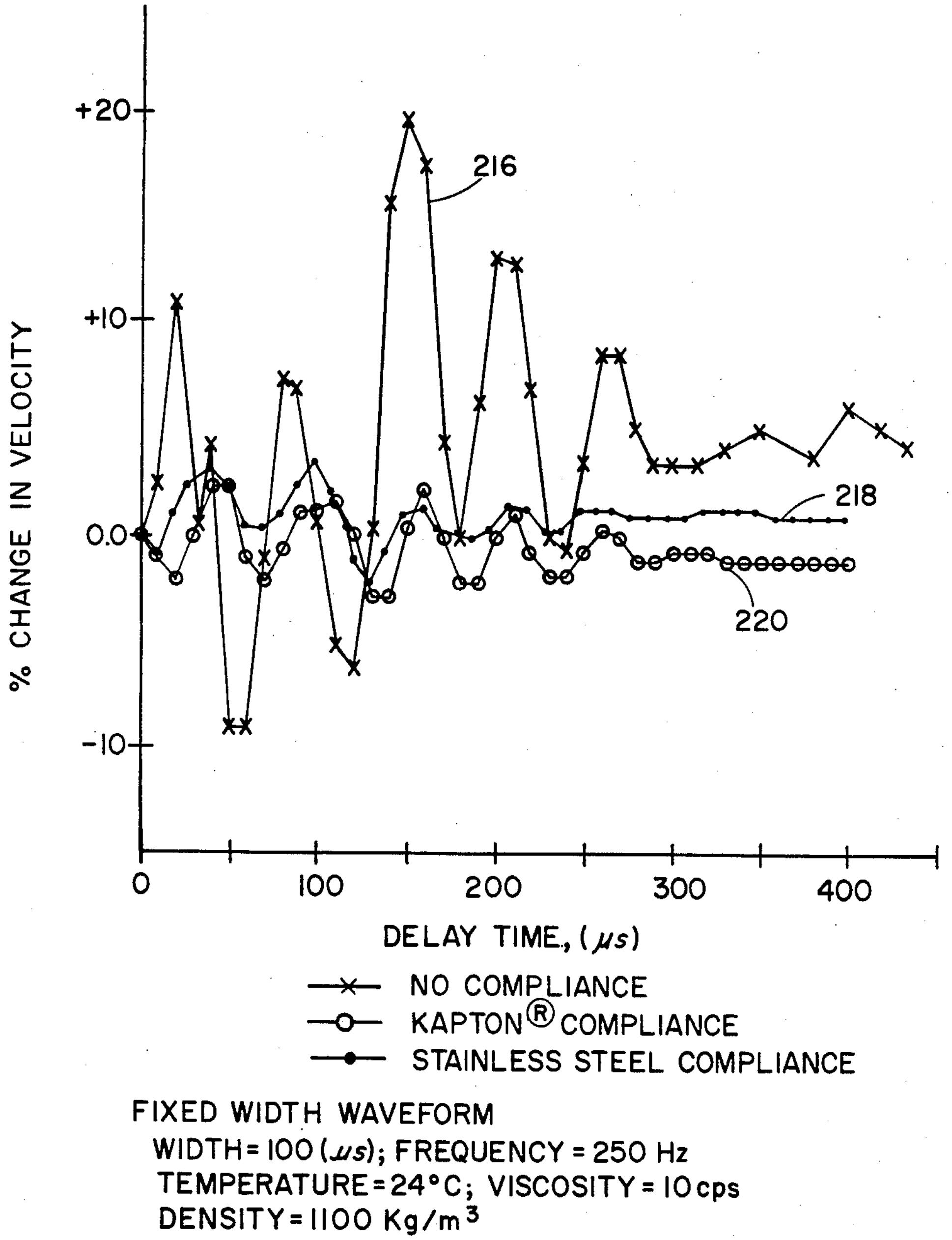
FIG. 22 is a plot of velocity variation of a droplet from a nozzle as a function of delay time from the ejection of a droplet from an adjacent nozzle illustrating the crosstalk behavior as experienced from operation of the print head of the present invention.

With continuing consideration of droplet velocity, FIG. 22 is a plot of velocity variation as a function of the time delay from ejection of a nearby droplet. This is a measure of crosstalk from one ink jet to another. It has been determined that the principal source of such crosstalk is fluid coupling through the manifold or manifolds. This contribution is large in comparison to the relatively small amount of crosstalk that results from vibration that is transmitted through the metal structure of the print head. FIG. 22 illustrates the effect of compliance on reducing crosstalk. The velocity of droplets of an adjacent nozzle normalized to the velocity of droplets under conditions of no crosstalk is plotted as a function of the delay time. Curve 216 therein indicates that change in velocity of as much as 20% may occur with no compliant membrane. In contrast, witness the results which occur with incorporation of a 20 micrometers thick stainless steel membrane as a compliance plate 166 (FIG. 11) which forms one surface of the fluid manifold common to a plurality of nozzles. In this instance, with reference to curve 218 the percentage change due to crosstalk is reduced to less than 1% at delay times greater than 120 microseconds, corresponding to frequencies of 8 KHz, which are of interest to this invention. Similar reduction in crosstalk was obtained (see curve 220) for a compliant membrane composed of Kapton brand polymeric sheet material having a thickness of 50 micrometers. It follows that the crosstalk reduction thus achieved is largely a function of the flexibility of the compliance plate 166.

Figure 24:
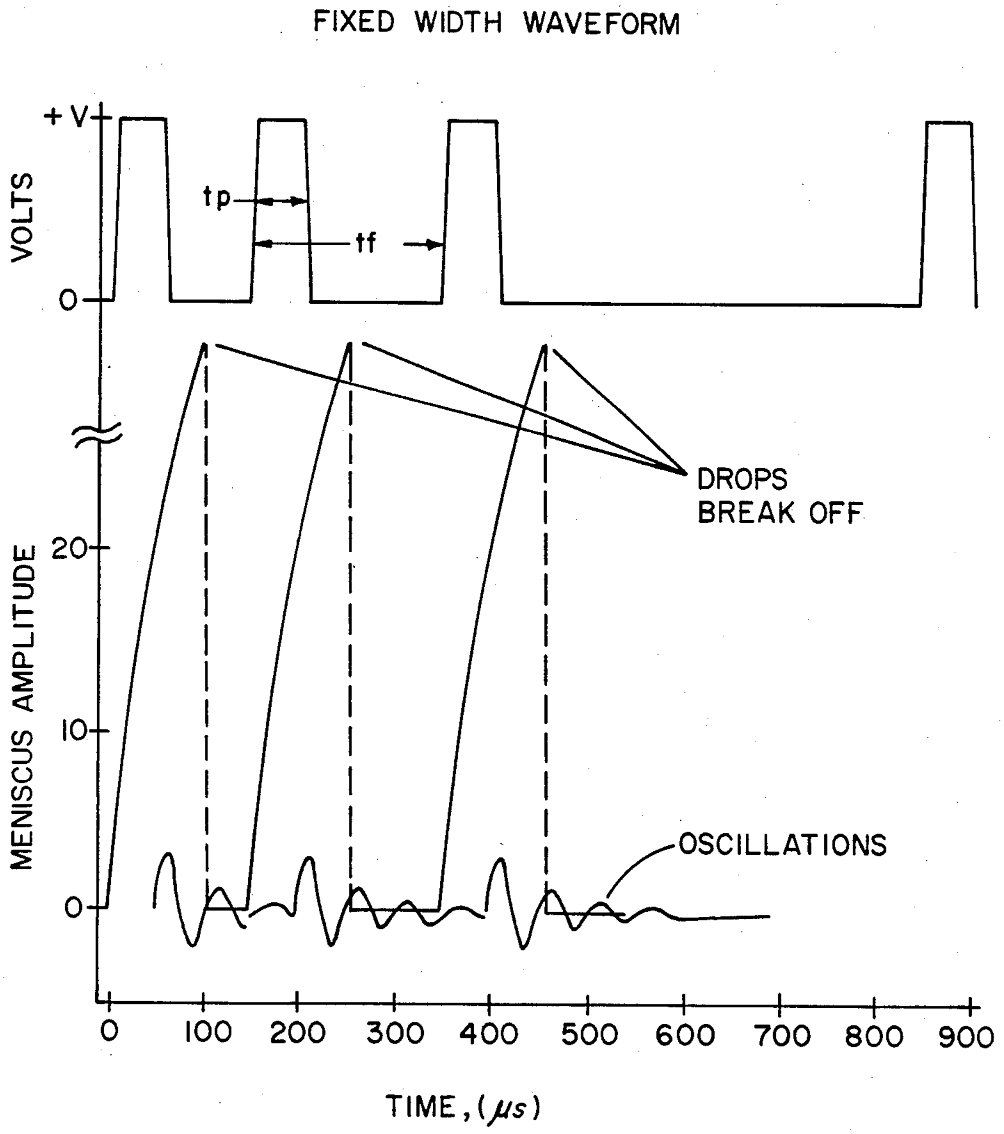
FIG. 24 shows a method of operation of the print head of the the present invention utilizing a fixed width waveform and the resulting meniscus displacement.

Two methods of operation have been identified. Both methods utilize a positive square waveform. In the first method of operation, hereafter referred to as the "fixed width waveform method", the transducer is energized with a positive voltage as shown in FIG. 24. The driver is bent from a neutral position to an active position extending down into its associated chamber 116. This causes the meniscus to extend beyond the nozzle sufficiently so that droplet ejection may occur. The driver is held at the bent position for a fixed period of time, $t_{pulse}$, typically in the range of 30 to 100 microseconds. The driver is then deenergized and thereby allowed to return to its neutral position. The observed breakoff time is typically 100 microseconds. Following the breakoff, the fluid in the meniscus continues to oscillate and eventually damps out. The period of oscillation corresponds typically to that of the compression mode resonance referred to earlier. This oscillation, if not damped, will interfere with the next droplet ejection causing velocity changes in the ejected droplet. Referring to FIG. 24 it is observed that this interference is more pronounced at higher droplet ejection rates. As evidenced in FIG. 16, one observes that the oscillations in velocity occur at droplet ejection rates higher than 3.5 KHz. Thus, this method limits the frequency of operation of the ink jet, despite the advantage of producing droplets of larger diameter. One may also choose to operate the ink jet at $t_{pulse}$ less than 30 microseconds to achieve higher droplet ejection rates with uniform velocity and diameter. This would require higher voltage. It has been found experimentally that with $t_{pulse}$ equal to 10 microseconds, one can extend the droplet ejection rate to 5 KHz with uniform velocity and diameter. This increased droplet ejection rate is possible because with shorter pulses the available time for damping of the oscillations from a previous droplet ejection is increased.

Figure 25:
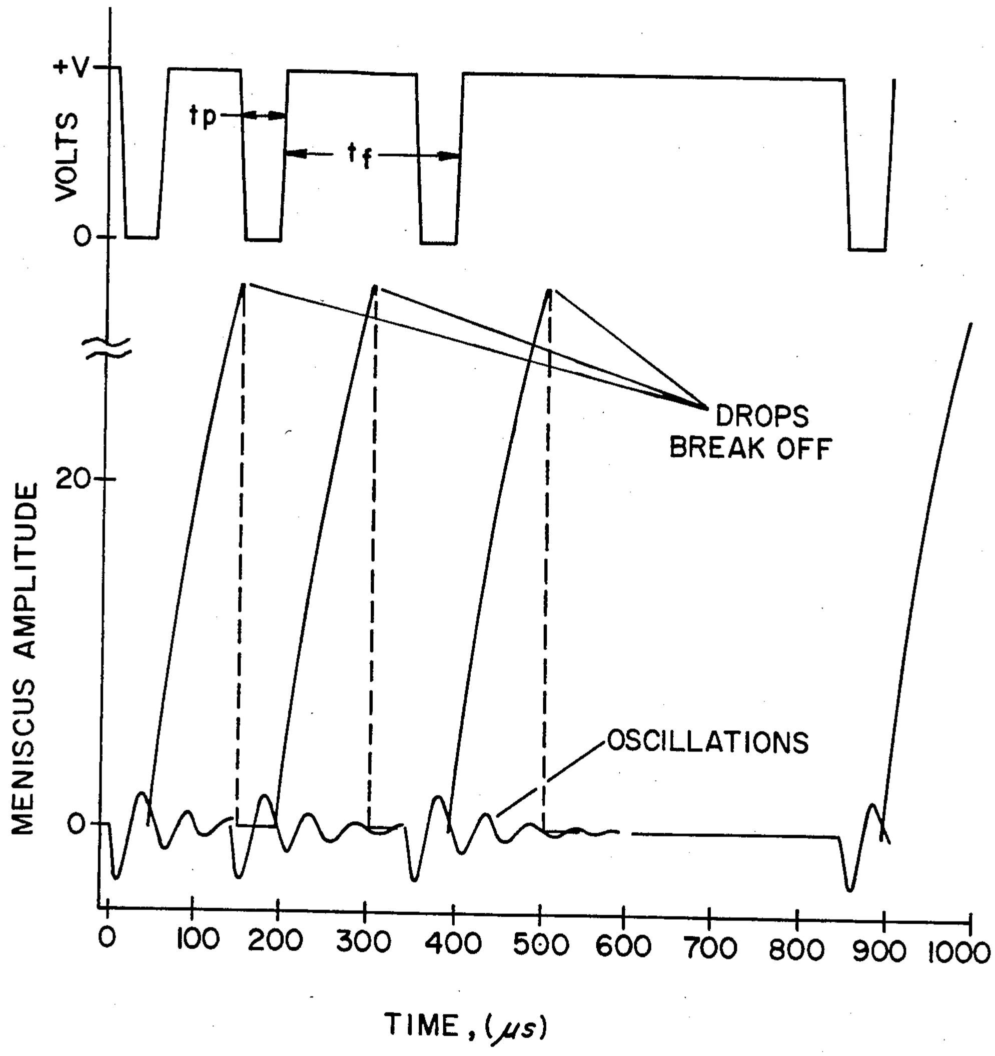
FIG. 25 shows a preferred method of operation of the print head of the present invention utilizing a variable width waveform and the resulting meniscus displacement.
Figure 26:
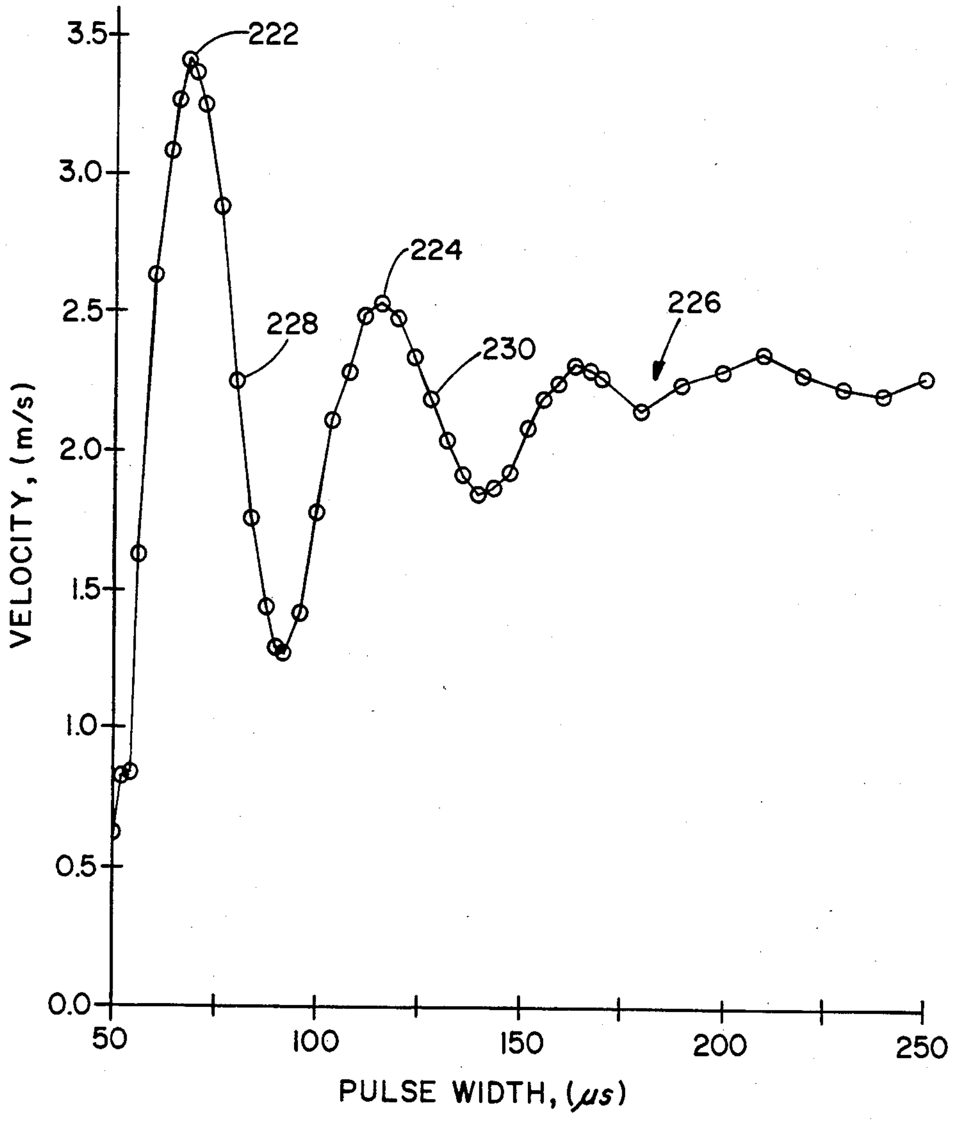
FIG. 26 is a plot of droplet velocity as a function of pulse width as experienced from operation of the print head of the present invention utilizing the variable width waveform.

The second method of operation, which is a feature of the present invention is illustrated in FIG. 25. This method will hereafter be referred to as the "variable width waveform method". In this method, the drivers are energized with a positive square waveform having a width such that the "off time" is preset. In the practice of the present invention, the driver is returned from the bent position to the neutral position. In contrast to the "fixed width waveform method", the de-energizing of the driver causes the meniscus to start oscillation as illustrated in FIG. 25. Since these oscillations occur at frequencies of the compression mode, one can choose any position along this oscillation to initiate the droplet ejection by energizing the driver. FIG. 26 displays the effect of the length of "off time" on the velocity of the ejected droplets. The first and second peaks occur at 68 and 116 microseconds, respectively, as indicated by reference numerals 222 and 224 on the curve 226. Hence it follows that the oscillation corresponds to a period of 48 microseconds or a frequency of 20.8 KHz, the compression mode. Even though one may operate at any point along the curve 226, it would be preferable not to operate at those pulse widths where the velocity is minimal. The experimental results for the ink jet of the present invention operated with this method, are shown in FIG. 19 wherein uniform velocity is achieved up to droplet ejection rates of 7 KHz. This behavior of the ink jet can be explained in the following manner.

Droplet velocity and droplet diameter are affected by the fluid oscillations caused by the variation in the voltage as a function of time which is applied to the piezoelectric driver before the ejection of the droplet. With a "fixed width waveform", the voltage is reduced back to zero a time $t_{pulse}$ after the beginning of the pressure pulse to eject a droplet. Thus the voltage history before droplet ejection is the same as for low droplet ejection rates for a time $t_f - t_{pulse}$ where $t_f$ is the time since the inception of the previous ejection pulse. With the "variable width waveform", the voltage as a function of time is the same as for low droplet ejection rates for the previous $t_f$. Consider an ink jet which requires a time $t_j$, that is, the time after a beginning or end of a voltage pulse for oscillations to decay sufficiently that they do not interfere with droplet ejection. If the pulse time is 100 microseconds and $t_j = 140$ microseconds, then the maximum operating frequency for a "fixed width waveform" is $1/(t_j+t_{pulse})=5$ KHz, while for a "variable width waveform" the maximum operating frequency is $1/t_f=7$ KHz.

Thus, the "variable width waveform" method is preferred for higher droplet ejection rates, since the available time for damping the oscillation from the previous droplet ejection is larger than the instance of the fixed width waveform. Considering the observation that the droplet break off time is 100 microseconds (10 KHz), the droplet ejection rate observed here approaches the theoretical limit based on the observed compression mode resonant frequency.

In summary, the use of the compact laminated structure of the print head, the precise mounting and sizing of the piezoelectric transducers on the diaphragm plate, and the optimization of the relative dimensions of the plates, orifices, and nozzles comprising the print head have produced an array of substantially identical ink jets that exhibit substantially identical performance over a range of frequencies extending to and including 7 KHz. This has been accomplished without the need of trimming or adjusting the individual drive levels to different transducers and without varying mechanical dimensions from one ink jet to another. The geometry allows nozzles to be stacked closely in a row and allows rows to be stacked relatively close together while maintaining the parallel structure of chambers and transducers. Crosstalk among ink jets is maintained at a minimum by providing a compliant membrane that is a portion of a fluid manifold and by properly sizing the restrictor. One of the results of the analysis that contributes to the achievement of these features is the use of a nozzle having a length approximately equal to its diameter and the use of a restrictor having a diameter substantially equal to that of the nozzle and having a length approximately equal to its diameter. These results are achieved with droplets having relatively large diameters, on the order of 70 to 80 micrometers.

Two methods of operation have been disclosed for use in conjunction with the ink jet of the present invention. In the fixed width waveform method, the ink jet produces droplet diameters on the order of 80 micrometers with uniform droplet velocity at a droplet ejection rate up to approximately 3.5 KHz. With pulses of the order of 10 microseconds, one can extend this droplet ejection rate to 5 KHz. In the variable width waveform method, which is preferred, the droplet velocities are substantially uniform up to and including a 7 KHz droplet ejection rate. The diameters of the ejected droplets are uniform up to approximately 70 micrometers.

The electronic circuitry controlling the operation achieving these results may utilize, for example, a monolithic D/CMOS integrated circuit such as Si9553 manufactured by Siliconix Incorporated, of Santa Clara, Calif.

While the preferred embodiments of the invention have been disclosed in detail, it should be understood by those skilled in the art that various modifications may be made to the illustrated embodiments without departing from the scope as described in the specification and defined in the appended claims.

What is claimed is:

1. An impulse ink jet print head comprising:

a plurality of operating plates held together in a superposed relationship including at least:

a first plate including at least a pair of nozzles therein for ejecting droplets of ink therethrough, each said nozzle having a diameter in the range of 50 to 85 micrometers and a length to diameter ratio in the range of approximately 1.0 to 2.0;

a second plate defining a pair of generally coplanar and rectangular ink chambers having dimensions lying in the range of 2 mm to 20 mm for length, 1.0 mm to 1.5 mm for width, and at least 0.15 mm for depth, said chambers being axially aligned along their major axes and proximately opposed to one another at their said end walls, each of said chambers connected to an ink supply and having an outlet for directing ink toward an associated one of said nozzles in said first plate;

each of said nozzles having a central axis extending transversely of the planes of said plates and intersecting said second plates at proximate extremities of each of said chambers;

said plates having passage means connecting each of said nozzles with an associated one of said outlets;

a third plate contiguous with said second plate including piezoelectric transducer means mounted thereon so as to overlie said pressure chambers and adapted, upon application of a voltage thereto, for displacing ink in each of said pressure chambers thereby causing the ejection of ink droplets from each of said nozzles, said transducer means being substantially coextensive with its associated said pressure chamber, said third plate with said transducer means thereon having a compliance in the range of 2 to $10\times10^{-18}$ $m^3/Pa$; and a fourth plate contiguous with said second plate having at least a pair of restrictors therein, each of said restrictors positioned intermediate the ink supply and an associated one of said chambers;

wherein ejection of droplets having a diameter of at least 80 micrometers occurs at frequencies up to 7 KHz without substantial variation in droplet diameter and speed.

2. An impulse ink jet print head as set forth in claim 1 wherein the voltage applied to said transducer means is no greater than 60 volts.

3. The print head of claim 1 wherein said plates are made of stainless steel.

4. The print head of claim 1 wherein said restrictors are substantially equal in diameter to said nozzles.

5. The print head of claim 4 wherein said restrictors and said nozzles are substantially equal in length at a value that is substantially equal to their diameters.

6. The print head of claim 5 wherein said restrictors and said nozzles have substantially equal diameters and lengths in a range of 50–85 micrometers.

7. An impulse ink jet print head as set forth in claim 1 wherein said chambers are proximately opposed to one another at their said endwalls, each of said opposed endwalls extending toward the other of said chambers in an interlaced relationship and overlapping a plane transverse to said second plate and containing axes of the outlets from said chambers and axes of both of said nozzles.

8. An impulse ink jet print head as set forth in claim 7 wherein the transverse plane is perpendicular to the major axes of said chambers.

9. An impulse ink jet print head as set forth in claim 1 wherein said outlets and their associated said nozzles are aligned on an axis perpendicular to the plane of said chambers.

10. An impulse ink jet print head as set forth in claim 1 including:

a fifth plate contiguous with said fourth plate having a manifold therein connected to an ink supply and an exit orifice in mutual communication with said pressure chamber and with said nozzle; and a sixth plate intermediate said fifth plate and said first plate and contiguous therewith to form a compliant exterior to said manifold in said fifth plate, said sixth plate having an exit orifice therein in mutual communication with said pressure chamber and with said nozzle;

said first plate having a compliance relief slot positioned in generally coextensive relationship with said manifold to permit motion of said sixth plate in response to pressure waves developed in said manifold.

11. An impulse ink jet print head comprising:

a plurality of operating plates held together in a superposed relationship including at least:

a first plate including at least one nozzle therein for ejecting droplets of ink therethrough;

a second plate defining at least one elongated ink chamber therein having relatively long sidewalls and relatively short endwalls, said chamber being connected to an ink supply and having an outlet for directing ink toward said nozzle in said first plate;

said nozzle having a central axis extending transversely of the planes of said plates and intersecting said second plate at an extremity of said chamber;

said plates having passage means connecting said nozzle with said outlet;

a third plate contiguous with said second plate and including piezoelectric transducer means adapted, upon application of a voltage thereto, for displacing ink in said chamber thereby causing the ejection of ink droplets from said nozzle;

a fourth plate contiguous with said second plate having a restrictor therein positioned intermediate the ink supply and said pressure chamber and an exit orifice in mutual communication with said pressure chamber and with said nozzle;

a fifth plate contiguous with said fourth plate having a manifold therein connected to an ink supply and an exit orifice in mutual communication with said pressure chamber and with said nozzle; and a sixth plate intermediate said fifth plate and said first plate and contiguous therewith to form a compliant exterior to said manifold in said fifth plate, said sixth plate having an exit orifice therein in mutual communication with said pressure chamber and with said nozzle;

said first plate having a compliance relief slot positioned in generally coextensive relationship with said manifold to permit motion of said sixth plate in response to pressure waves developed in said manifold.

12. An impulse ink jet print head as set forth in claim 11 wherein:

said nozzle has a diameter disposed generally in the range of 50 to 85 micrometers and a length to diameter ratio generally disposed in the range of 1.0 to 2.0;

said pressure chamber having dimensions lying in the range of 2 mm to 20 mm for length, 1.0 mm to 1.5 mm for width, and at least 0.15 mm for depth; and said third plate including said transducer means having a compliance in the range of 2 to $10\times10^{-18}$ $m^3/Pa$;

whereby droplet ejection of droplets having a diameter of at least 80 micrometers occurs at frequencies up to 7 KHz without substantial variation in droplet diameter and speed.

13. An impulse ink jet print head comprising:

a plurality of operating plates held together in a superposed relationship including at least:

a first plate including at least one nozzle therein for ejecting droplets of ink therethrough, said nozzle having a diameter in the range of 50 to 85 micrometers and a length to diameter ratio in the range of approximately 1.0 to 2.0;

a second plate defining at least one elongated ink chamber therein having dimensions lying in the range of 2 mm to 20 mm for length, 1.0 mm to 1.5 mm for width, and at least 0.15 mm for depth, said chamber being connected to an ink supply and having an outlet for directing ink toward said nozzle in said first plate;

said nozzle having a central axis extending transversely of the planes of said plates and intersecting said second plates at an extremity of said chamber;

said plates having passage means connecting said nozzle with said outlet;

a third plate contiguous with said second plate including piezoelectric transducer means mounted thereon so as to overlie said pressure chamber and adapted, upon application of a voltage thereto, for displacing ink in said chamber thereby causing the ejection of ink droplets from said nozzle, said transducer means being substantially coextensive with its associated said pressure chamber, said third plate including said transducer means having a compliance in the range of 2 to $10\times10^{-18}$ $m^3/Pa$; and a fourth plate contiguous with said second plate having a restrictor therein, positioned intermediate the ink supply and said pressure chamber;

wherein ejection of droplets having a diameter of at least 80 micrometers occurs at frequencies up to 7 KHz without substantial variation in droplet diameter and speed.

14. An impulse ink jet print head as set forth in claim 13 wherein the voltage applied to said transducer means is no greater than 60 volts.

15. The print head of claim 13 wherein said plates are made of stainless steel.

16. The print head of claim 13 wherein said restrictor is substantially equal to diameter to said nozzle.

17. The print head of claim 16 wherein said restrictor and said nozzle are substantially equal in length at a value that is substantially equal to their diameters.

18. The print head of claim 17 wherein said restrictor and said nozzle have substantially equal diameters and lengths in a range of 50–85 micrometers.

19. An impulse ink jet print head as set forth in claim 13 wherein said outlet and said nozzle are aligned on an axis perpendicular to the plate of said chambers.

20. A method of operating an ink jet print head defining an ink chamber therein having an inlet for filling the chamber and a nozzle and including piezoelectric driver means for displacing ink in the chamber movable about a de-energized position in the absence of an applied voltage and an energized position in the presence of an applied voltage for imparting a sequence of pressure waves to the ink in the chamber thereby causing the ejection from the nozzle of successive discrete ink droplets having a diameter of at least 70 micrometers at droplet ejection rates up to 7 KHz without substantial variation in droplet diameter and speed while avoiding interference from fluid oscillations caused by a previous droplet ejection comprising the steps of:

imparting a voltage pulse for a first variable period of time to move the driver means to the energized position;

reducing the voltage applied to the driver means for a fixed period of time chosen such that the velocity of a droplet ejected from the nozzle is substantially equal to the median of a series of velocities possible as a function of pulse width and resulting from the pressure waves present in the fluid;

imparting a voltage pulse for a second variable period of time to again move the driver means to the energized position; and again reducing the voltage applied to the driver means for the fixed period of time.

21. A method as set forth in claim 20 wherein the voltage is reduced to zero in the second step.

22. A method as set forth in claim 20 wherein the duration of the fixed periods of time is approximately in the range of 50 to 200 microseconds.

23. A method as set forth in claim 20 wherein the print head is of the construction including a plurality of operating plates held together in a contiguous superposed relationship and comprising a first plate having a nozzle therein for ejecting droplets of ink therethrough, a second plate defining an ink chamber therein overlying said nozzle, and a third plate including driver means for displacing ink in the chanber thereby causing the ejection of ink droplets from said nozzle.

24. A method of operating an ink jet print head as set forth in claim 20 wherein the magnitude of the voltage applied to the driver means is no greater than 60 volts and wherein the duration of the step of de-energizing the driver means lies in the range of 50 to 200 microseconds.

25. A method as set forth in claim 20 wherein the ink employed has a surface tension of approximately 40 dynes per cm or higher and a viscosity between approximately 6.0 and 15 cp.

26. A method of operating an ink jet print head of the construction including a plurality of operating plates held together in a contiguous superposed relationship and comprising a first plate having a nozzle therein for ejecting droplets of ink therethrough, a second plate defining an ink chamber therein overlying said nozzle, and a third plate including piezoelectric driver means for displacing ink in the chamber thereby causing the ejection of ink droplets from said nozzle, the piezoelectric driver means being movable about a de-energized position in the absence of an applied voltage and an energized position in the presence of an applied voltage, the method comprising the steps of:

imparting a voltage pulse for a first fixed period of time to move the driver means to the energized position;

reducing the voltage imparted to the driver means for a variable period of time;

imparting a voltage pulse for a second fixed period of time to again move the driver means to the energized position; and again reducing the voltage imparted to the driver means for a variable period of time;

thereby imparting a sequence of pressure waves to the ink in the chamber and causing the ejection from the nozzle of discrete ink droplets having a diameter of at least 80 micrometers at droplet ejection rates up to 3.5 KHz without substantial variation in droplet diameter and speed.

27. A method as set forth in claim 26 wherein the voltage is reduced to zero in the second step.

28. A method as set forth in claim 26 wherein the duration of the fixed periods of time is approximately in the range of 50 to 200 microseconds.

29. A method as set forth in claim 26 wherein the ink employed has a surface tension of approximately 40 dynes per cm or higher and a viscosity between approximately 6.0 and 15 cp.

30. A method of operating an ink jet print head of the construction including a plurality of operating plates held together in a contiguous superposed relationship and comprising a first plate having a nozzle therein for ejecting droplets of ink therethrough, a second plate defining an ink chamber therein overlying said nozzle, and a third plate including piezoelectric driver means for displacing ink in the chamber thereby causing the ejection of ink droplets from said nozzle, the piezoelectric driver means being movable about a de-energized position in the absence of an applied voltage and an energized position in the pressure of an applied voltage, the method comprising the steps of:

imparting a voltage pulse for a first fixed period of time to move the driver means to the energized position;

reducing the voltage imparted to the driver means for a variable period of time;

imparting a voltage pulse for a second fixed period of time to again move the driver means to the energized position; and again reducing the voltage imparted to the driver means for a variable period of time;

wherein the duration of the fixed periods of time is approximately in the range of 10 to 30 microseconds;

thereby imparting a sequence of pressure waves to the ink in the chamber and causing the ejection from the nozzle of discrete ink droplets having a diameter of at least 80 micrometers at droplet ejection rates up to 5 KHz without substantial variation in droplet diameter and speed.

31. A method as set forth in claim 30 wherein the ink employed has a surface tension of approximately 40 dynes per cm or higher and a viscosity between approximately 6.0 and 15 cp.

* * * * *